(12) United States Patent
Dang et al.

(10) Patent No.: US 7,379,907 B2
(45) Date of Patent: May 27, 2008

(54) APPARATUS, SYSTEM AND METHOD FOR REPORTING FINANCIAL DATA AND REMITTING FUNDS OVER AN INTERACTIVE COMMUNICATIONS NETWORK OR THE LIKE

(75) Inventors: Hong Michael Dang, Los Gatos, CA (US); Hwei-Hwa Alice Lin, Cupertino, CA (US); Martin Trostel, Tuebingen (DE); Kooi Karl Yap, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1257 days.

(21) Appl. No.: 09/995,190

(22) Filed: Nov. 26, 2001

(65) Prior Publication Data

US 2003/0105686 A1    Jun. 5, 2003

(51) Int. Cl.
*G07F 19/00* (2006.01)
(52) U.S. Cl. ....................................................... 705/31
(58) Field of Classification Search .................. 705/31
See application file for complete search history.

(56) References Cited

U.S. PATENT DOCUMENTS

| | | | |
|---|---|---|---|
| 5,644,724 A * | 7/1997 | Cretzler | 705/19 |
| 5,774,872 A | 6/1998 | Golden et al. | 705/19 |
| 5,799,283 A | 8/1998 | Francisco et al. | 705/19 |
| 5,875,433 A | 2/1999 | Francisco et al. | 705/26 |
| 6,003,016 A | 12/1999 | Hagemier | 705/19 |
| 6,064,983 A | 5/2000 | Koehler | 705/31 |
| 6,078,898 A | 6/2000 | Davis et al. | 705/19 |
| 6,078,899 A | 6/2000 | Francisco et al. | 705/19 |
| 6,183,140 B1 | 2/2001 | Singer et al. | 395/231 |
| 6,202,052 B1 * | 3/2001 | Miller | 705/31 |
| 6,298,333 B1 | 10/2001 | Manzi et al. | 705/31 |
| 6,625,581 B1 * | 9/2003 | Perkowski | 705/27 |
| 2002/0198743 A1 * | 12/2002 | Ariathurai et al. | 705/4 |

OTHER PUBLICATIONS

Gage, Theodore Justin. Tools introduced to aid with growing EFT payments. Corporate Cashflow. vol. 14, Iss. 7. Jun. 1993. pp. 12-13.*

* cited by examiner

*Primary Examiner*—James A. Kramer
*Assistant Examiner*—Jason Borlinghaus

(57) ABSTRACT

A computer-implemented method includes transmitting tax related data to a selected financial institution, reporting the data and remitting funds corresponding to the data, over an interactive communications network, to a selected government authority. XML-based transaction requests and responses may be used to facilitate the method.

6 Claims, 20 Drawing Sheets

FIG. 12

Transaction Approval

TransactionID: 444
ACH Status: FullXml File Created

Transaction Detail Summary:

| Request Type | State | TaxPayer | Beneficiary | Debit | Credit | Prenote |
|---|---|---|---|---|---|---|
| ACHTransferProceeds | | | TaxWare | | 10000 | NO |
| ACHCreditToState | MI | O.C.Tanner | | | 1000 | NO |
| ACHTransactionWithTaxpayer | WI | O.C.Tanner | | 10000 | | NO |
| ACHTransferProceeds | | | HP | | 0 | YES |
| ACHCreditToState | KS | O.C.Tanner | | | 1000 | NO |
| | | | Total Debit | 10000 | | |
| | | | Total Credit | | 12000 | |

○ Get Remittance Request File
○ Get FullXml File
○ Approve  ○ Reject  ○ Suspend  [SUBMIT]

*FIG. 13*

ReviewLogs: Microsoft Internet Explorer provided by Hewlett Packard

TransactionID: 444
ACH Status: FullXml File Created

The Remittance Request is:
```
<?xml version=1.0"?>
<!DOCTYPE HPRoot SYSTEM..../SalesTaxRemittance/SalesTaxRemittanceRequest.dtd">
<HPRoot>
  <RequestMessageHeader BusinessProcess ="SalesTaxRemittance"
         MessageName="SalesTaxRemittanceRequest MessageVersion="1.0">
      <Originator HP </Originator>
      <MessageID> 6Xsairgunduuu3000980f/MessageID>
      <CreatedAt> 2001-03-11T10:56:03 </CreatedAt>
      <CreatedBy>
          <Hostname> riptide.hp.com </Hostname>
          <HostID> 15.61.232.240 </HostID>
          <ProgramName> SubmitSalesTaxRemittance </ProgramName>
      </CreatedBy>
  </RequestMessageHeader>
  <SalesTaxRemittanceRequest>
      <BatchNumber> 101 </BatchNumber> <CompanyName Name="HP-5457"/>
      <EffectiveEntryDate> 010411 </EffectiveEntryDate>
      <EntryDetail>
          <SequenceNumber>1</SequenceNumber> <ACHTransferProceeds> <TransactionCode
                Code="Credit"/> <Beneficiary Name="Taxware"/>
                <Amount>10000</Amount> <AddendaRecord>
                    Debit </AddendaRecord>> </ACHTransferProceeds>
      </EntryDetail>
  </SalesTaxRemittanceRequest>
  <SalesTaxRemittanceRequest>
      <BatchNumber> 102 </BatchNumber> <CompanyName Name="HP-5457"/>
      <EffectiveEntryDate> 010411 </EffectiveEntryDate>
      <EntryDetail>
```

APPARATUS, SYSTEM AND METHOD FOR REPORTING FINANCIAL DATA AND REMITTING FUNDS OVER AN INTERACTIVE COMMUNICATIONS NETWORK OR THE LIKE

BACKGROUND OF THE INVENTION

The present invention relates generally to data processing and, more particularly, to a novel apparatus, system and method for remitting financial data over an interactive communication network or the like.

Domestic businesses are usually required by state and local authorities to charge sales and/or use tax for most commercial transactions relating to goods. Typically, each business is required to (i) calculate based upon a formula how much to charge for each transaction, (ii) file a return with the authorities identifying the amount of revenue collected, taxes accrued and any exemptions, (iii) periodically remit the amount of taxes owed to the authorities, (iv) issue check requests, and (iv) defend audits undertaken by such authorities.

Traditional methods of preparing and reporting tax information to government authorities have essentially been manual. In particular, at the close of each reporting period (monthly, quarterly or annually), financial representatives of the merchants, e.g., accountants, would consolidate all of the merchant's relevant sales and other transactional data and manually calculate the amount of sales and/or use tax owed. Selected forms, periodic tax payments, checks and other paperwork often necessary for reporting taxes would then be sent to the authorities via "snail mail". Since this process is essentially manual and is usually based only on information provided by the merchant, the merchant often had control over what was disclosed to their representative and, ultimately, what was reported to the authorities. Consequently, this practice allowed those relatively unscrupulous merchants to avoid paying taxes on considerable portions of their sales and other commercial transactions.

As a manual process, this method of tax compliance has also been prone to human error, not only in the accuracy of data collected, but also in the computation of the taxes owed. In addition, tax remittance was frequently delayed due to documents being late or lost in the mail, or merchants simply forgetting or otherwise omitting to remit sales and other transactional data to the authorities. The merchant would then be penalized for the late or incorrect tax payment.

With the advent of the computer, many businesses developed customized tax calculation systems in order to semi-automate the tax preparation process. While these systems have been useful, because businesses and their financial constructs vary widely, their software solutions often not only had to be tailored to each trade, but also applications had to be created that are specific to the particular requirements of each business. This resulted in considerable expense as well as delay in servicing the business's software needs. To further automate the tax preparation process, it was frequently necessary to integrate the tax software solutions with other business software. This required further customization of software applications as well as that of interface and other programs needed for integrating system-wide applications. Moreover, these systems frequently required trained personnel for effective operation and proper system maintenance. Despite the automation, an accounting staff was still required to monitor and review the accuracy of each tax calculation, and to prepare tax returns. This was especially true where the taxable transactions involved multiple tax jurisdictions, since traditional systems lacked the analytical capability for multi-jurisdictional tax decisions.

Still other systems required dedicated hardware and communications links. Although effective for some operations, these systems similarly required modification for application to new businesses, in other countries, or for purposes of monitoring transactions other than those for which it was designed. With the onset of e-commerce, while attempts have been made to adapt existing systems to the on-line environment, tax authorities have found themselves unable to monitor or collect sales tax on transactions that are conducted over the Internet.

Furthermore, such systems have experienced difficulty in maintaining high-level security, namely, privacy, authentication and integrity during system access and transaction processing. These issues have been found especially problematic during complex transactions or other tasks where large volumes of financial data are exchanged over the Internet. As the volume and complexity of transactions increased, the systems instantaneously had to compensate. When so burdened, conventional systems often struggle with operability, reliability, availability, scalability and load balancing, whereas the consumer, e.g., the financial industry, demands their on-line services twenty-four (24) hours a day, seven (7) days a week. To insure long term supportability, such systems must also utilize free public domain, commonly off-the-shelf (or CTOS), open source and other industry standard software.

A tax reporting system is, therefore, desired that automatically reports taxable transactions to state and federal authorities securely and effectively without the need otherwise for human intervention.

SUMMARY OF THE INVENTION

According to one aspect of the present invention, there is provided a program controlled system for reporting tax related information to a selected financial institution, reporting the data and remitting funds corresponding to the data to a selected government authority. The system comprises a first function for receiving an XML-based transaction request from a program controlled tax computation system, verifying the validity of the request and replying to the system with an XML-based response. A second function transforms the transaction request into a master XML-based request file and stores the master request file in a database. Also provided is a third function for notifying an authorized third party to validate any request requiring approval prior to transmission of the tax related information file to the financial institution. In addition, the system utilizes a fourth function for transforming the master XML-based request to a TXP-based file and locating the file in an outbox for retrieval by the financial institution. A fifth function permits the financial institution to securely and automatically retrieve the TXP-based file from the outbox. Finally, a sixth function securely logs and allows the third party to review the TXP-based file.

In accordance with another aspect of the present invention is a program controlled apparatus for transmitting tax related data to a selected financial institution, reporting the data and remitting funds corresponding to the data to a selected government authority. The apparatus comprises a first function for receiving an XML-based transaction request from a program controlled tax computation system and replying to the system with an XML-based response including a transaction identifier. A second function verifies the validity of the XML-based request of the tax computation system and stores the valid transaction request in a database. Also provided is a third function for transforming the request into a master XML-based request and storing the master request in the database. In addition, the system uses a fourth function to notify an authorized third party to validate any request requiring approval prior to transmitting the tax related data. A fifth function builds a total XML-based file and transforms the file into a first TXP-based file for remitting information associated with the file, over an automated clearinghouse network, to a selected government authority. The fifth function also copies the first TXP-based file to an outbox file for secure and automatic access by the financial institution. A sixth function receives the first TXP-based file as a first TXP-based receipt file in an inbox file subsequent to processing of the first TXP-based file by the financial institution. Finally, a seventh function decrypts the first TXP-based receipt file, stores the decrypted file as a second TXP-based receipt file in the database, and substantially deletes the first TXP-based file and the first TXP-based receipt file from the outbox file and inbox file, respectively.

According to a further aspect of the present invention is a program controlled apparatus for transmitting tax related data to a selected financial institution, reporting the data and remitting funds corresponding to the data to a selected government authority. The system includes a first function for receiving an XML-based transaction request from a tax computation system and replying with an XML-based response including a transaction identifier. A second function verifies the validity of the XML-based request of the tax computation system and stores the valid transaction request in a database. Also provided is a third function for transforming the request into a master XML-based request and storing the master request in the database. In addition, the system has a fourth function for notifying an authorized third party to validate any request requiring approval prior to remitting the tax related data. A fifth function builds a total XML-based file and transforms the file into a first TXP-based file for remitting information associated with the file to a selected government authority. The fifth function also copies the TXP-based file to an outbox file for secure and automatic access by the financial institution. A sixth function receives the first TXP-based file as a first TXP-based receipt file in an inbox file subsequent to processing of the first TXP-based file by the financial institution. Finally, a seventh function decrypts the first TXP-based receipt file, stores the decrypted file as a second TXP-based receipt file in the database, and replaces each first TXP-based file and first TXP-based receipt file in the outbox file and inbox file, respectively, with a null file.

In accordance with yet another aspect of the present invention is a program controlled apparatus which performs a method for transmitting tax related data to a selected financial institution, reporting the data and remitting funds corresponding to the data to a selected government authority. Initially, an XML-based transaction request is input to the apparatus from a tax computation system. The request is read and data of the request is written in a selected XML-based input file of a database. Next, the input file is parsed to determine whether the XML-based transaction request is valid. If the request is invalid, an XML-based file is created including the request and error, and the file is sent as a response to the tax computation system. If, on the other hand, the request is valid, then the type of request being made is determined. If the request is a status request, a transaction identifier is extracted from the request, a file is retrieved from the database containing the current automated clearinghouse network status and other data for the request, an XML-based response to the request is created to indicate that the request has been successful, and, finally, the response is sent to the tax computation system. If the request is a remittance request, then it is determined whether all required elements of the request are non-blank. Should all required elements of the request be non-blank, then it is determined whether the amount of tax computed is valid. In the event that the amount of tax computed is valid, then it is determined whether the message identifier in the request is unique. And if the message identifier is unique, then the request is stored in a log file of the database, the transaction identifier for the request is retrieved from the database, a file is created including the request and transaction identifier to indicate that the request has been successful, and the file is sent to the tax computation system. Finally, if at least one required element of the request is blank, or if the amount of tax computed is invalid, or if the message identifier is not unique, then an XML-based file is created that includes the request and error to indicate that the request is erroneous, and the file is sent to the tax computation system.

According to still another aspect of the present invention is a program controlled apparatus for transmitting tax related data to a selected financial institution, reporting the data and remitting funds corresponding to the data to a selected government authority. The apparatus creates a master XML-based file by a method which first retrieves a log file from a database indicating that a successful request for remittance of tax related information has been made. Next, a master XML-based transaction request file is created. The master XML-based file is then stored in the log file of the database. An XML-based network status file is accessed from the database and the file updated to indicate that the master XML-based file has been created in the log file.

In accordance with yet a further aspect of the present invention, there is provided a program controlled apparatus for transmitting tax related data to a selected financial institution, reporting the data and remitting funds corresponding to the data to a selected government authority. The apparatus creates a TXP-based file for an automated clearinghouse network by initially determining whether a TXP-based file for the automated clearinghouse network is present in an outbox of a system for receiving an XML-based transaction request from a tax computation system and converting the request to a TXP-based file for the network. If a TXP-based file for the network is detected in the outbox, then no conversion is performed on the TXP-based file. If, on the other hand, no TXP-based file for the network is detected in the outbox, then an automated sequence number is selected for updating an XML-based file for the automated clearinghouse network. Should a request from the tax computation system not have been processed, then a master XML-based request file is retrieved from a database that has an automated clearinghouse network approval status. Thereafter, the retrieved master XML-based request file is combined with a total XML-based request file. The total XML-based file is converted to a TXP-based file for the network, and the total XML-based file and TXP-based file are stored in a log file of the database. Next, a status file for the network in the database is updated to indicate that a TXP-based file for the network has been created for XML-based transaction requests in the master XML-based request file. Finally, the total XML-based request file is deleted.

It is, therefore, an object of the present invention to provide an improved apparatus, system and method for reporting financial data and remitting funds over an interactive communications network.

Another object of the present invention to provide an automated system for converting XML-based messages from a tax computation system or the like to a TXP compatible file for ready access by a selected financial institution of an automated clearinghouse network.

A further object of the present invention is to provide a browser-based GUI program for displaying all XML-based and TXP-based file messages entered into the system.

Yet another object of the present invention is to provide an apparatus and system for automated sales and/or use tax reporting and payment for merchants or the like.

Still another object of the present invention is to provide an apparatus, system and method for reporting and remitting tax related data over an interactive communications network so as to eliminate the need to manually file a tax return.

Yet a further object of the present invention is to provide software code in modular form for automated conversion of XML-based messages from a tax computation system or the like to a TXP-based file for ready access by a selected financial institution.

Another object of the present invention is to provide an apparatus, system and method for optimizing the speed of data transfer from an XML-based transaction performed by a tax computation system to TXP-based data for an automated clearinghouse network.

Still a further object of the present invention is to provide a reliable automated apparatus, system and method for the rapid transfer of XML-based transaction data from a tax computation system to TXP compatible data for an automated clearinghouse network, simply, efficiently and economically.

Yet another object of the present invention is to improve the speed and quality of financially related data transferred between merchants, financial institutions and government authorities.

A further object of the present invention is to enhance data transfer over an interactive communications network.

The present invention will now be further described by reference to the following drawings which are not intended to limit the accompanying claims.

BRIEF DESCRIPTION OF THE DRAWINGS

FIG. 12 is a screen-shot illustrating a virtual portal for viewing selected details concerning a transaction to be approved, according to the system of FIG. 10

FIG. 13 is a screen-shot illustrating a virtual portal for enabling a user to approve/reject/suspend the transaction viewed in FIG. 12;

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Figure 1:
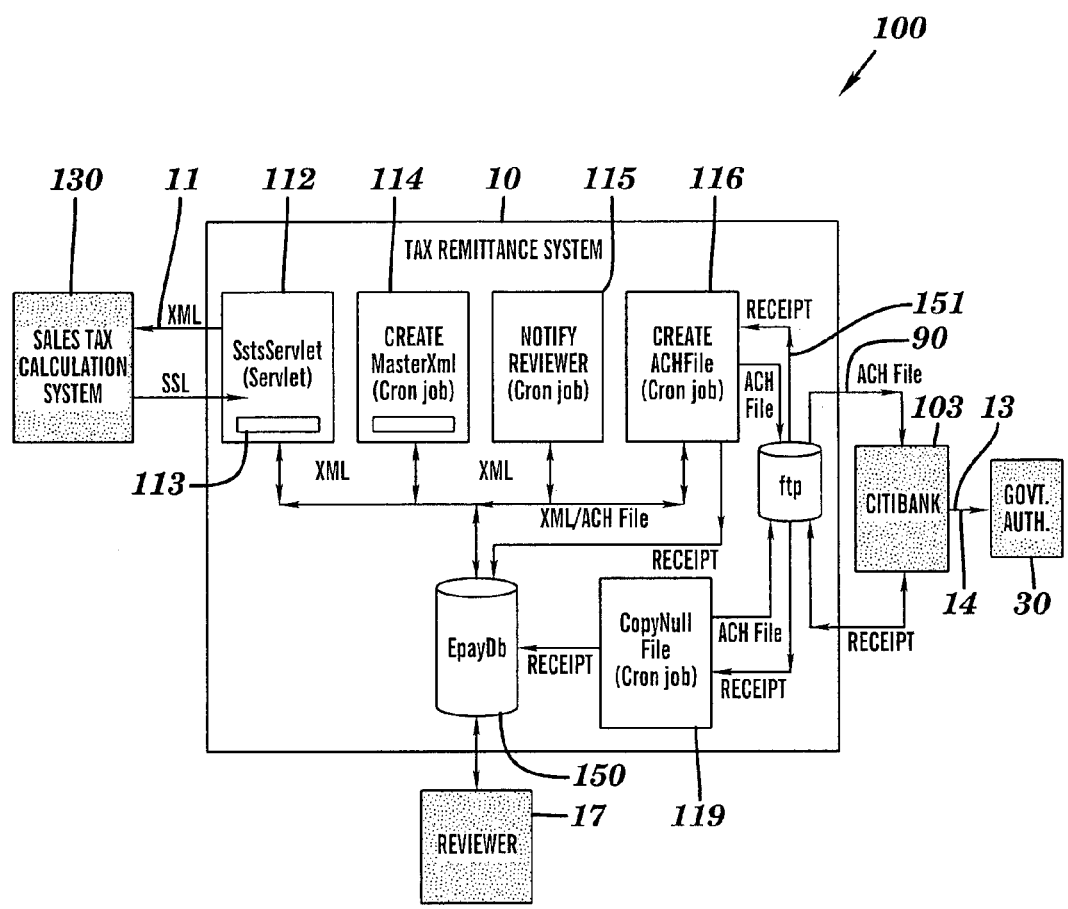
FIG. 1 is a flow diagram showing a system and method for reporting tax related information and remitting funds relating to the same to a selected financial institution, according to one aspect of the present invention.

Referring now to the drawings and, more particularly, to FIGS. 1-19, there is shown a specific, illustrative automated apparatus 10, a system 100 and a method 200 for reporting a subscriber's tax related information and fund remittance relating to the same. In particular, sales and/or use tax is automatically reported and payment of corresponding funds 14 made to selected government authorities 30, e.g., local, state and/or federal government treasuries, on each taxable transaction of a subscriber 40, virtually eliminating the need for the subscriber to file an annual tax return. Such subscribers include taxpayers, e.g., merchants, vendors, or the like. According to one aspect of the present invention, method 200 is performed through machine code in modular form resident on a server 51 of a service provider 50 or service provider computer system 102, i.e., a service provider version module 120, or a subscriber computer system 101, i.e., a merchant-subscriber version module 110. The merchant, for example, subscribes to the service and obtains from the service provider the code necessary to interface with the service provider system.

Preferably, subscriber computer system 101, for supporting the subscriber module, includes a conventional server 60, e.g., an HP 9000 Server or HP Netserver such as at the O.C. Tanner Virtual Store at www.octanner.com, and/or a computerized cash register bank or network system 70, e.g., an in-store processor including an HP 9000 Server linked via an intranet with a plurality of conventional NCR computer cash registers, Verfone or the like electronic cash register system, suitable for effective network communication, through the subscriber computer system, with the service provider system.

Preliminary to execution of the present invention, tax computations are preferably performed by a conventional tax computation engine 130, in modular form, e.g., TaxWare, a software product of TaxWare International, Inc. or an enhanced software system for computation of sales and/or use tax for payments and accruals, e.g., T-Square. A system of this general description is described, for example, in a co-pending U.S. patent application, entitled INTELLIGENT APPARATUS, SYSTEM AND METHOD FOR FINANCIAL DATA COMPUTATION AND ANALYSIS, HP Docket No. 100110474, filed on the same date herewith by Robert J. Gallagher, Theresa O. Watson, Natalie D. Milner-Upshaw, Penny L. Arviso, Paul J. Kunzler and Barry Schneiderman, the disclosure of which is hereby incorporated by reference herein in its entirety.

Figure 7:
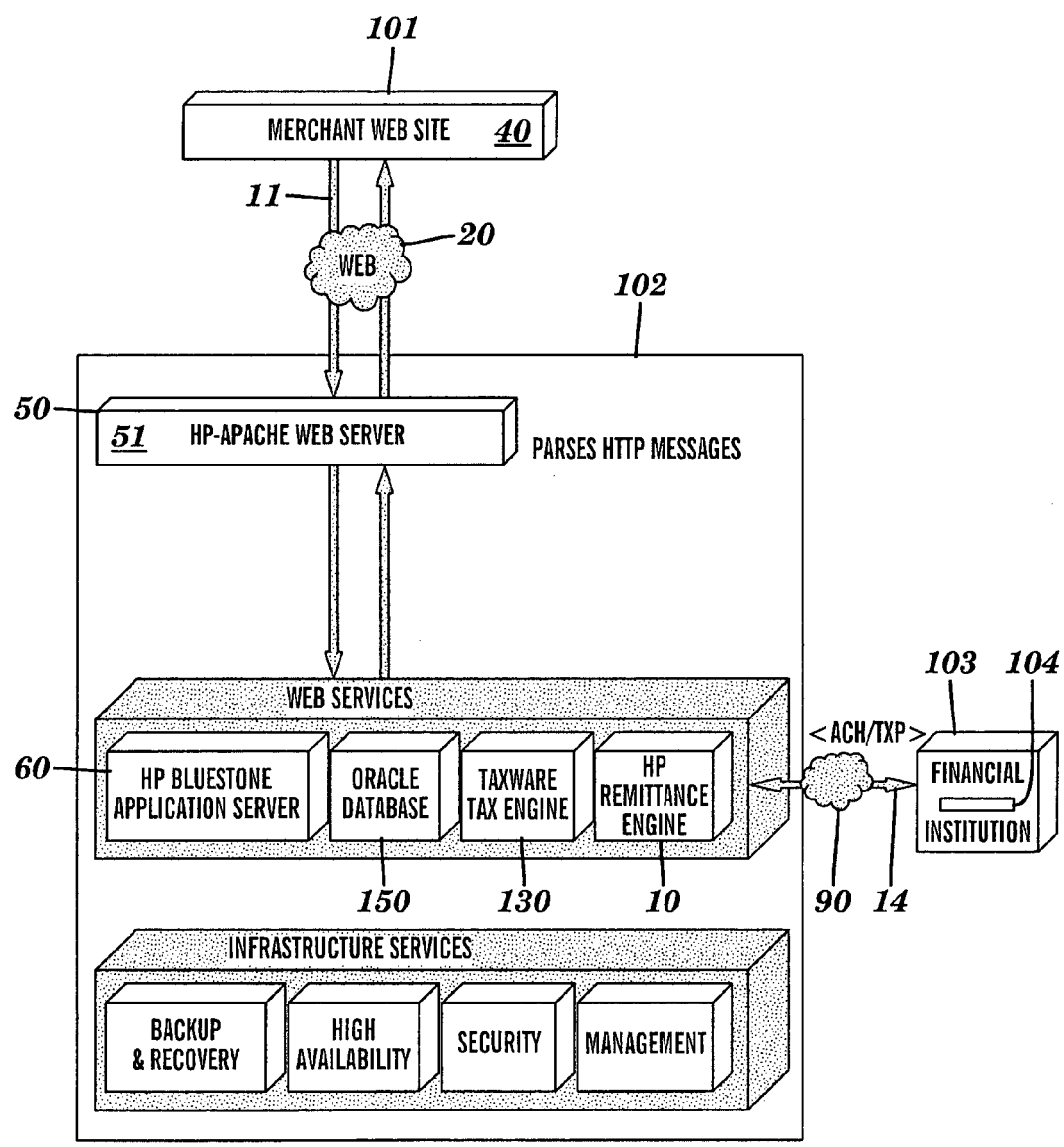
FIG. 7 is a schematic diagram showing a system for calculating taxes due on transactions, reporting the same to a selected government authority, and periodically remitting the taxes owed over an interactive communications, according to one aspect of the present invention.
Figure 8:
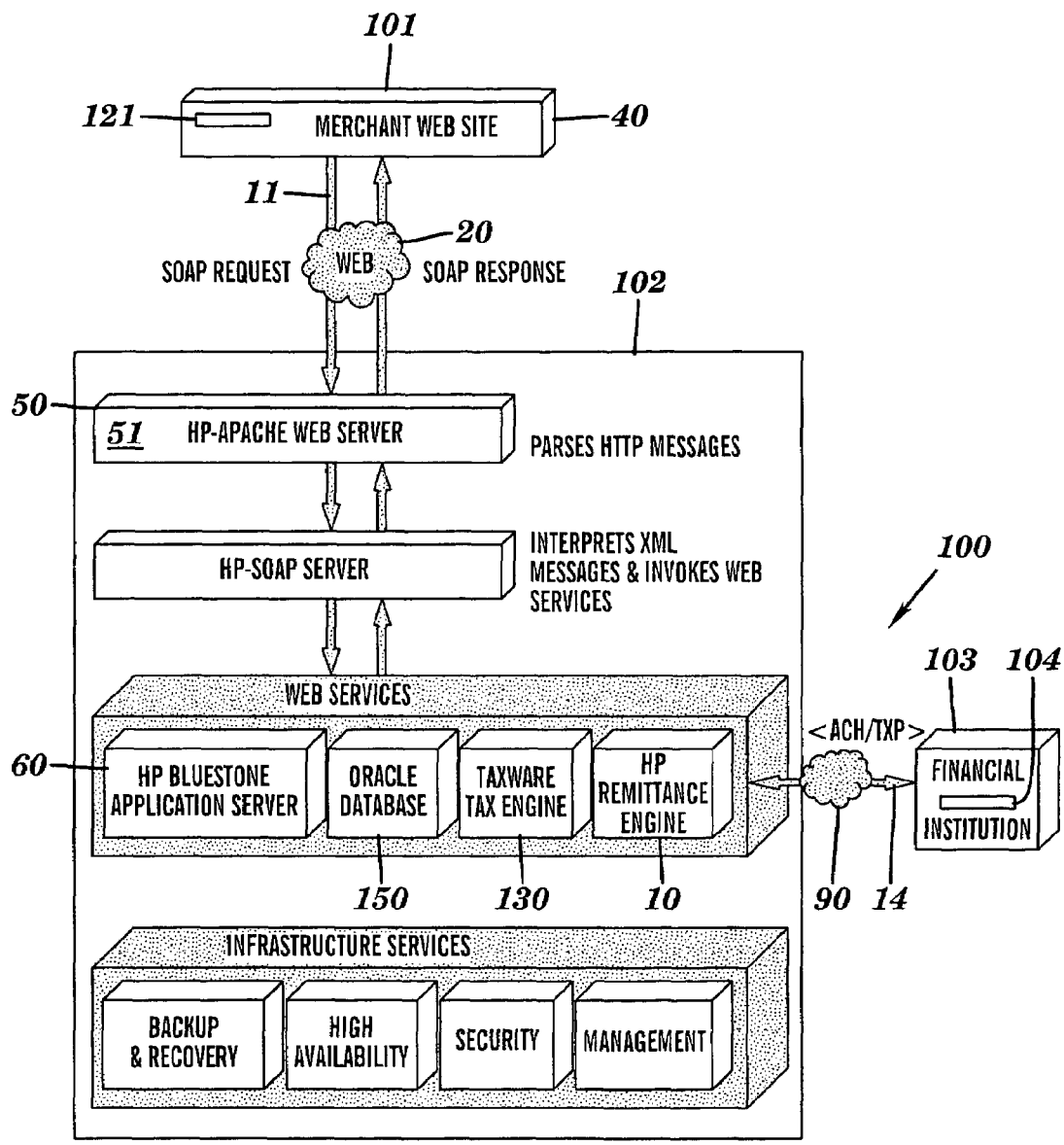
FIG. 8 is a schematic diagram showing a system for calculating taxes due on transactions, reporting the same to a selected government authority, and periodically remitting the taxes owed over an interactive communications, according to another aspect of the present invention.

In one embodiment, as shown in FIGS. 7 and 8, service provider system 102 houses a plurality of software modules 111 operating over an interactive communications network 20, e.g., the Internet, an intranet or an extranet, and having access to an automated clearinghouse network 90. A system of this general description is provided, for example, in a co-pending U.S. patent application, entitled AN INTELLIGENT APPARATUS, SYSTEM AND METHOD FOR FINANCIAL DATA COMPUTATION, REPORT REMITTANCE AND FUNDS TRANSFER OVER AN INTERACTIVE COMMUNICATIONS NETWORK, HP Docket No. 100111405, filed on the same date herewith by Hong M. Dang, Kooi K. Yap, Hwei-Hwa A. Lin and Martin Trostel, the disclosure of which is hereby incorporated herein in its entirety. Alternatively or concurrently, the service provider system is accessed over telephone lines through a conventional mail order system, or directly though over-the-counter transactions, as will be understood by those skilled in the art.

In operation, each time a transaction is made by or with the subscriber, subscriber system 101 transmits a message or transaction request 11 to service provider system 102, e.g., via e-mail, a dial-up connection or the like. According to one aspect of the present invention, the transaction request is an XML-based message (or an extensible markup language-based document) containing data that describes the type of goods (e.g., food), the value of a selected item of the goods, the subscriber's location, the subscriber's taxpayer number (or account number with the service provider), time and date information as well as the shipping location. In response, service provider system 102 delivers the information to tax computation module 130. It is preferred that this module be suitably adapted for determining the correct sales and/or use tax for each transaction performed (across several states), the applicable tax rate and format required, and sending an XML-based response or reply 15 (also an extensible markup language-based document) to subscriber 40. Subscriber system 101 then displays to its customer the total amount due and tax details, typically through a conventional Web browser. A suitable browser, in this connection, is Microsoft Internet Explorer Version 4.0 or the like. The customer may then decide whether or not to consummate the transaction. If the consumer accepts, a new XML-based transaction request is sent by the subscriber system to the service provider system and the record of the transaction stored in a service provider system database 150.

Operations, according to the present invention, may then commence. According to one embodiment of the present invention, tax computation module 130 sends, at regular intervals (e.g., daily, weekly, monthly or quarterly) XML-based transaction requests 11 or like instructions to system 100 of the present invention. These instructions, for instance, ask the system to report tax related data and to remit funds corresponding to the data to a selected service provider account 104 of a selected financial institution 103 and to pay appropriate government authorities 30. Preferably, each government authority has automated audit and report generation capability through direct tax authority access to a subscriber reporting module 121. Also, the subscriber may request that the transaction be reported, upon request, to determine the amount of taxes that have been paid for the current fiscal period. Optionally, a return generating module 140 periodically (e.g., quarterly, semi-annually or annually) and automatically generates appropriate tax return information and reports, i.e., electronically, the information to the appropriate government authorities.

Turning now to data processing operations, according to various aspects of the present invention, and, more particularly, to FIGS. 1 and 7-9, apparatus 10 and system 100 are provided for transmitting tax related data 12 to selected financial institution 103, reporting the data or any taxes due 13 to selected government authority 30 and/or the subscriber, and remitting funds 14 corresponding to the data, over interactive communications network 20, to the selected government authority. According to one aspect of the present invention, as shown in FIG. 1, the system comprises a first module or function 112 for receiving XML-based transaction request 11 from program controlled tax computation module 130. This function also verifies the validity of the request and replies to the system with XML-based reply 15, preferably including a transaction identifier 16. A second module or function 113 verifies the validity of the XML-based request from the tax computation system. It also stores the valid transaction request in database 150.

Next, a third module or function 114 transforms the request into a master XML-based request 16 and stores the master request in the database. A fourth module or function 115 then notifies an authorized third party such as a tax reviewer 17, preferably by electronic means, to validate any request requiring approval prior to transmitting the tax related data. A fifth module or function 116 builds a total XML-based file 151, transforms the file into a first TXP-based file 152 for remitting information associated with the file over a network, e.g., automated clearinghouse network 90, to the selected government authority, and for copying first TXP-based file 152 to an outbox file 153 for secure and automatic access by financial institution 103. As will be appreciated by those skilled in the art, TXP (i.e., tax transaction payment language) and, more particularly, ACH/TXP is a specific data format for electronic funds transfer relating to taxes and, namely, to those transmitted over the automated clearinghouse network.

Thereafter, a sixth module or function 117 of apparatus 10 receives the first TXP-based file as a first TXP-based receipt file 154 in an inbox file 155 subsequent to processing of the first TXP-based receipt file by the financial institution. Finally, a seventh module or function 118 decrypts first TXP-based receipt file 154, stores the decrypted file 156 as a second TXP-based receipt file 157 in the database, and substantially deletes the first TXP-based file and the first TXP-based receipt file from outbox file 153 and inbox file 155, respectively. Alternatively or concurrently, a seventh and/or eighth module or function 119 is provided which decrypts the first TXP-based receipt file, stores the decrypted file as a second TXP-based receipt file in the database, and replaces each of the first TXP-based files and the first TXP-based receipt files in the outbox file and inbox file, respectively, with a null file 158.

Although the present invention is shown and described in the context of sending and receiving data in XML-based and TXP-based formats, it will be appreciated by those skilled in the art that other suitable data formats may be utilized, within the spirit and scope of the present invention. In addition, while the present invention is illustrated as having first service provider server for hosting numerous system monitoring and other utility functions, it is understood that a plurality of service provider servers may be provided, each hosting one or more applications and/or any combination thereof on the multiple servers, giving consideration to the purpose for which the present invention is intended.

Generally speaking, according to one aspect of the present invention, automated clearinghouse network (or ACH) 90, or access thereto, is provided for facilitating the transfer of funds to government authorities. In one embodiment, ACH is a nationwide, batch-oriented electronic funds transfer system that provides for interbank clearing of electronic payments 91 for participating depository financial institutions 92, e.g., Citibank. Examples include The American Clearinghouse Association, Federal Reserve, Electronic Payments Network and VISA. Each of these institutions, in effect, act as a central clearing facility (or ACH operator) through which member financial institutions can transmit or receive entries through the automated clearing house.

Figure 6:
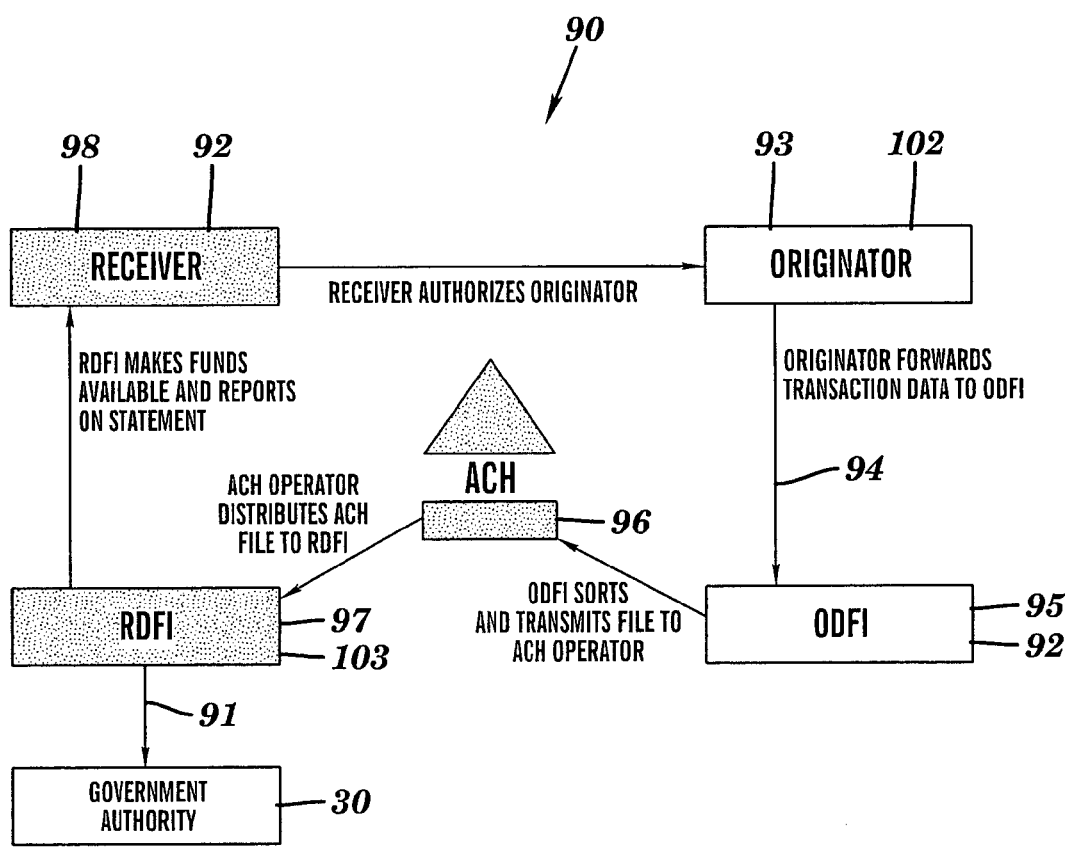
FIG. 6 is a flow diagram showing an automated clearinghouse network, according to one aspect of the present invention.

Operation of the clearinghouse network is illustrated, for instance, in FIG. 6. In one embodiment, an originator 93, such as an individual, a corporation or other entity, that desires access to the network initiates entries in the automated clearinghouse network. This is typically done by forwarding a file 94 containing processed tax transaction data to an originating depository financial institution (or ODFI) 95. An ODFI is a participating financial institution that originates automated clearinghouse network entries at the request of and by agreement with its customers. Typically, ODFI's are bound by provisions of the NACHA standard industry operating rules and guidelines. The ODFI sorts and transmits the data file to an automated clearinghouse network operator 96.

Next, the network operator distributes the data file to a receiving depository financial institution (or RDFI) 97. An RDFI is typically any financial institution qualified to receive automated clearinghouse network entries that also agrees to abide by the NACHA standard industry operating rules and guidelines. The RDFI makes funds corresponding to the data file available and then reports them on a statement to a receiver 98. The receiver is preferably an individual, a corporation or other entity authorized as an originator, i.e., to initiate a credit or debit entry to a transaction account held at the RDFI.

The foregoing description is provided for purposes of illustration and not to limit the intended environment or application of the present invention. The remaining structural and functional aspects of automated clearinghouse networks are known by those skilled in the art and further description is considered unnecessary for illustration of the present invention.

The use of an automated clearing house banking network for performing electronic funds transfer (or EFT) provides many advantages over conventional methods which utilize a credit card service for sales and/or use tax payment. First, this network is considerably less expensive that performing electronic funds transfers using a credit card service. For instance, with an automated clearinghouse network, it typically costs only a few cents to execute each electronic funds transfer regardless of the amount of the transaction. A credit card transaction, on the other hand, usually involves a charge of 2%-3% of the transaction amount. Since the cost of an automated clearinghouse network funds transfer is fixed, whereas the cost of a credit card transaction increases in proportion to the size of the amount transferred, the cost savings associated with the use of the automated clearinghouse network can be very large.

In addition, the automated clearinghouse network is currently the primary way in which most domestic financial institutions accomplish electronic funds transfers. Example ACH transactions include most payroll deposits, automatic mortgage payments and car payments. Moreover, the automated clearinghouse network is advantageous in being the standard network supported by all states for sales tax remittance. The defined standard file format for sales tax remittance to all states is ACH/TXP.

Figure 9:
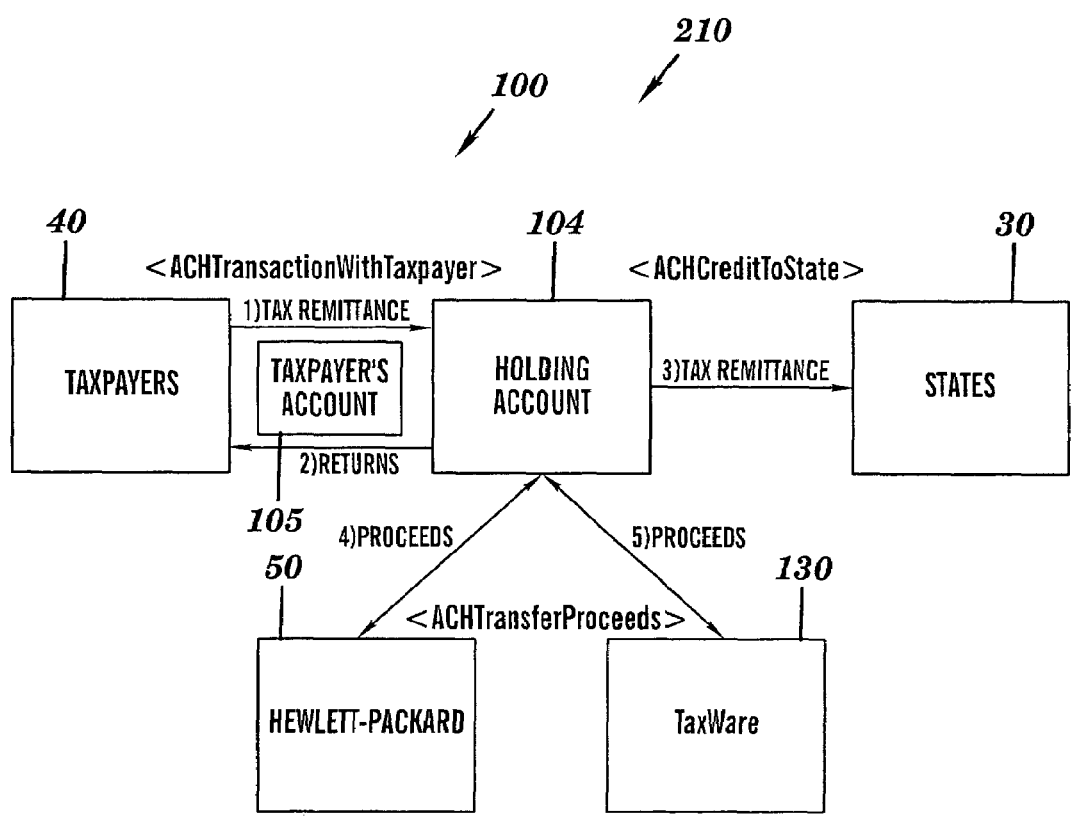
FIG. 9 is a flow diagram of a system for tax revenue remittance from taxpayers to state treasuries over an interactive communications network.
Figure 9A:
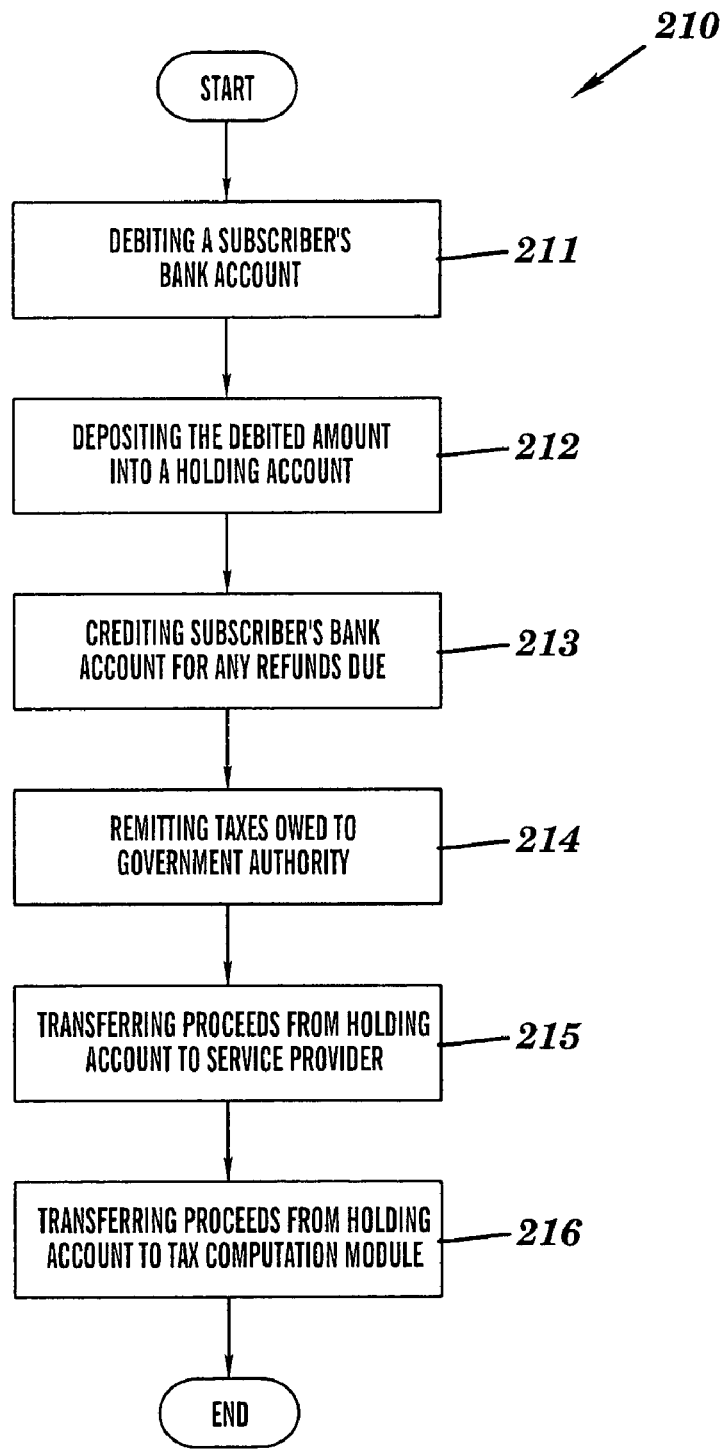
FIG. 9A is a flow diagram illustrating a method for moving funds, according to the system of FIG. 9.
Figure 10:
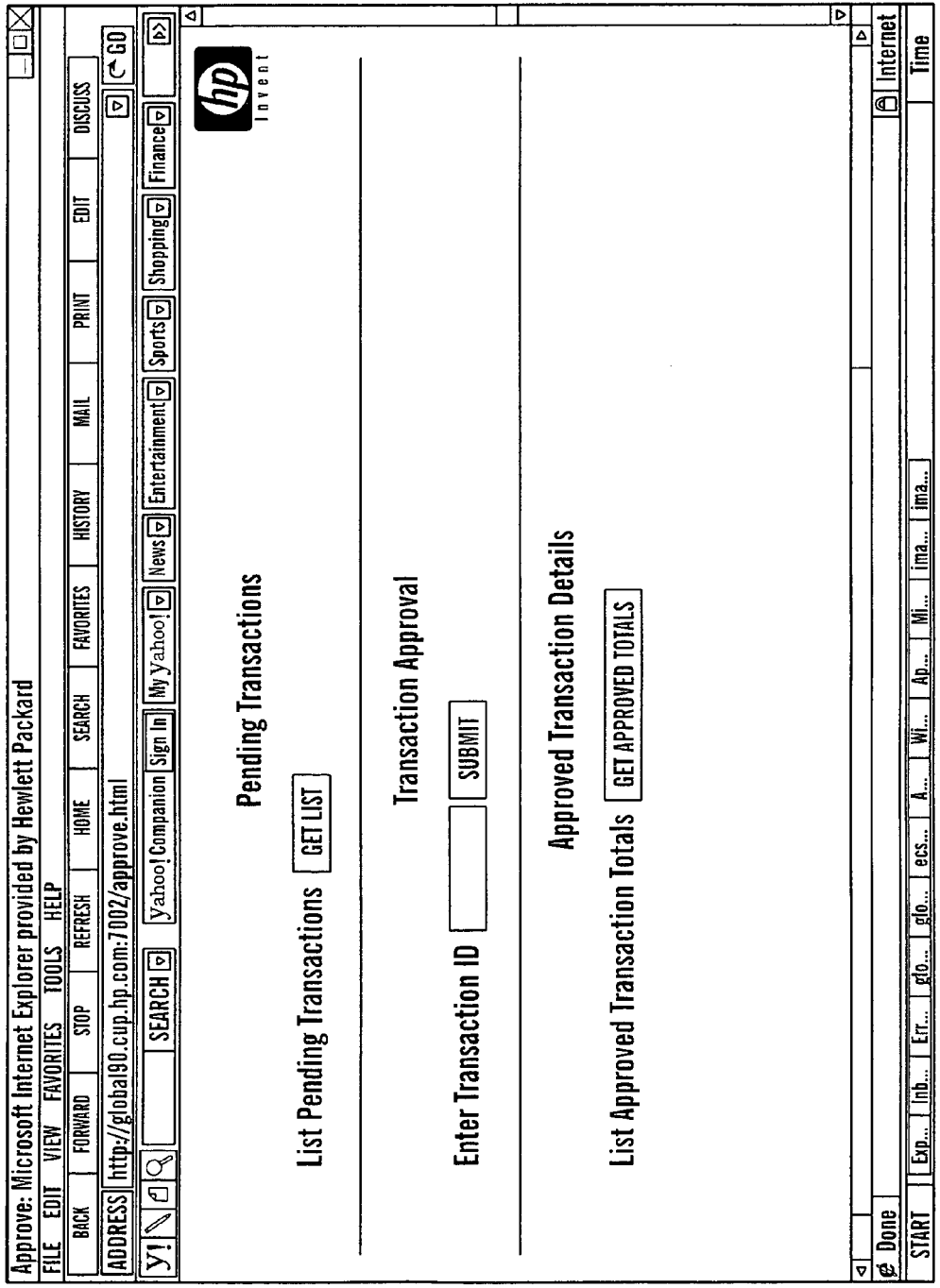
FIG. 10 is a screen-shot illustrating a virtual portal for entry to a system for transmitting tax related information to a financial institution, according to one aspect of the present invention.
Figure 11:
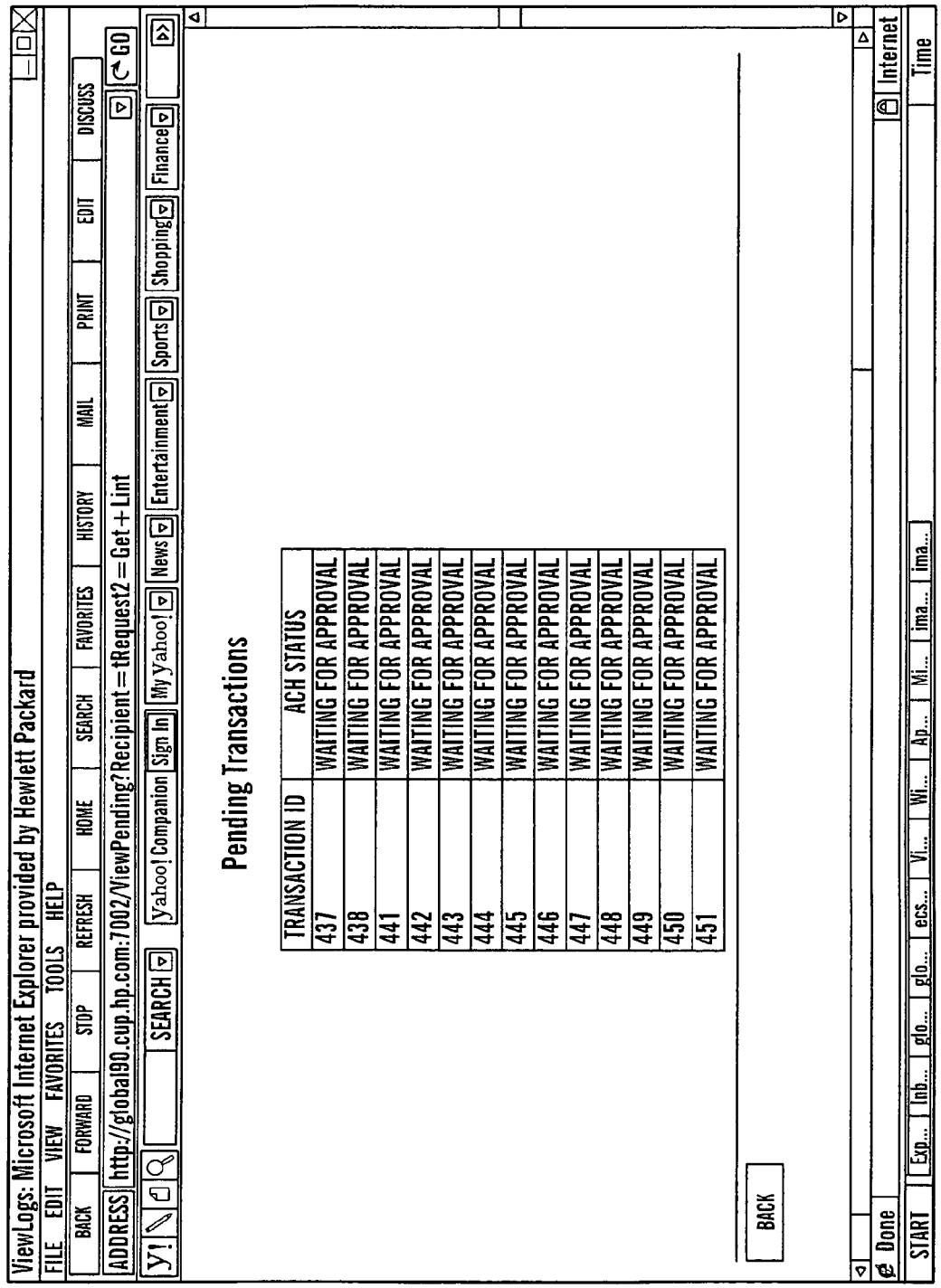
FIG. 11 is a screen-shot illustrating a virtual portal for viewing transactions waiting for approval, rejection or suspension upon entry to the system of FIG. 10.

According to another aspect of the present invention, as best seen in FIGS. 9 and 9A, is system 100 and a method 210 of moving funds, a.k.a., a sales tax remittance request process. First, a taxpayer or subscriber's bank account 105 is debited 211 for sales and/or use tax remittance and deposited 212 into service provider or holding account 104 with <ACHTransactionWithTaxpayer>. Second, the subscriber's bank account is credited 213 for any refunds with <ACHTransactionWithTaxpayer>. Next, the tax owed is remitted 214 to government authority 30, e.g., local, state and/or federal government treasury, with <ACHCreditToState>. Fourth, proceeds from the holding account are transferred 215 to service provider 50, e.g., Hewlett-Packard, using <ACHTransferProceeds>. Finally, the proceeds are transferred 216 from the holding account to tax computation module 130, e.g., Taxware, with <ACHTransferProceeds>.

It is preferred that each sales tax remittance request XML-based message contain selected elements. Exemplary message elements are set forth below in Table I:

| XML Message | Element Description |
| --- | --- |
| <HPRoot> | The root of this XML message. Required. |
| <RequestMessageHeader BusinessProcess="SalesTaxRemittance" MessageName="SalesTax RemittanceRequest" MessageVersion=="1.1.0"> | Message Header and Version. Required and fixed. |

-continued

| XML Message | Element Description |
|---|---|
| <Originator e-dsize="40">Taxware</Originator> | Message Originator. Required |
| <MessageID e-dsize="40">89a49914-ae86-11d4-a603-0800098cdlaf</MessageID> | This message identification uniquely identifies this message. Required. |
| <CreatedAt TimeZone="GMT" e-dtype="dateTime">2000-10-30T09:56:03</CreatedAt> | Creation date and time is defined in the ISO8601 format. Required. For Example, 2000-10-30T09:56:03 is Oct. 30, 2000 at 9:56:03 am |
| <CreatedBy> | Describes the creator of message. Required. |
| <Hostname e-dsize="30">riptide.taxware.com</HostID> | The computer hostname which created this message. Required. |
| <HostID e-dsize="20">123.123.323.240</HostID> | The IP address (123.123.232.240) of the computer that created this message. Required. |
| <ProgramName e-dsize="30">SubmitSalesTax Remittance</ProgramName> | The name of the computer program that created this message. Required. |
| <SalesTaxRemittanceRequest> | This is a batch of Sales Tax Remittance Request messages. Required. |
| <BatchNumber e-dsize="7" e-dtype="int">10</BatchNumber> | This is the batch number for this group of Sales Tax Remittance Request Messages. Required. |
| <CompanyName e-dsize="16">HP</CompanyName> | This is the company in which this ACH transaction batch is being executed for. Required. |
| <CompanyDiscretionaryData e-dsize="20">Sales Tax</CompanyDiscretionaryData> | Discretionary data of this company. Required. |
| <CompanyDescriptiveDate e-dsize="6"e-dtype="date">001030</CompanyDescriptiveDate> | The originator establishes this field as the date (YYMMDD) it would like to see displayed to the receiver for descriptive purposes. Optional. |
| <EffectiveEntryDate e-dsize"6" e-dtype="date">001102</EffectiveEntryDate> | The effective entry date is the date (YYMMDD) specified by the originator on which it intends a batch of entries to be settled. The effective entry date shall be either one or two banking days following the processing date. Required. |
| <EntryDetail> | This is the Entry Detail Record for each ACH Debit or Credit transaction. Required. |
| <SequenceNumber e-dsize="7" e-dtype="int">1</SquenceNumber> | This field contains the sequence number within a batch of entries. Required. |
| <ACHCreditToState> | This is an entry for sending a sales tax remittance from the holding account to a State. Required. |
| <CreditCode Code="Prenote" /> | There are two credit codes-"Credit" and "Prenote". Prenote is to be used for testing an ACH transaction, and the amount should be zero. Required. |
| <State State="MI" /> | This State will receive this Sales Tax Remittance. Required. |
| <Amount e-dsize="10" e-dtype="int">000000000</Amount> | This amount ($$$$$$$$$$$cc without decimal point) will be credited to the State for Sales Tax Remittance. Required. |
| <TaxpayerFederalID e-dsize="15">123456789012345</TaxpayerFederalID> | TaxpayerFederalID is, depending on the State, the Federal Employer Identification Number or the State assigned number. Required. |
| <TaxPeriodEndDate e-dsize"6" e-dtype="date">001031</TaxPeriodEndDate> | This is used to indicate the end date (YYMMDD) for the tax period for which the payment is being made. Required. |
| <TaxpayerVerification e-dsize="6">ABCCom</TaxpayerVerification> | The Taxpayer Verification is an optional data element that may be used by the receiver to verify the taxpayer's identity. Optional. |
| <ACHTransactionWithTaxpayer> | This is an entry for sending a sales tax remittance from a taxpayer to holding account or for sending a refund from holding account to taxpayer. Required. |
| <TransactionCode="CreditPrenote" /> | There are four transaction codes-"Credit", "CreditePrenote", "Debit", and "DebitPrenote". Prenote is to be used for testing an ACH transaction, and the amount should be zero. Required. |
| <State State="MI" /> | This State is involved in the Sales Tax Remittance. Required. |
| <Amount e-dsize="10" e-dtype="int">0000000000</Amount> | This amount ($$$$$$$$$cc without decimal point) will be credited to the State for Sales Tax Remittance. Required. |
| <ACHTransferProceeds> | This is an entry for sending proceeds from holding account to HP/TaxWare or for sending proceeds from HP/TaxWare to holding account. Required. |
| <Beneficiary="HP" /> | This Beneficiary is involved in this Sales Tax Remittance. Required. |
| <AddendaRecord e-dsize="15">123456789012345 <AddendaRecord> | AddendaRecord is, depending on the State, th Federal Employer Identification Number or the State assigned number. Required. |

EXAMPLE I

Figure 16:
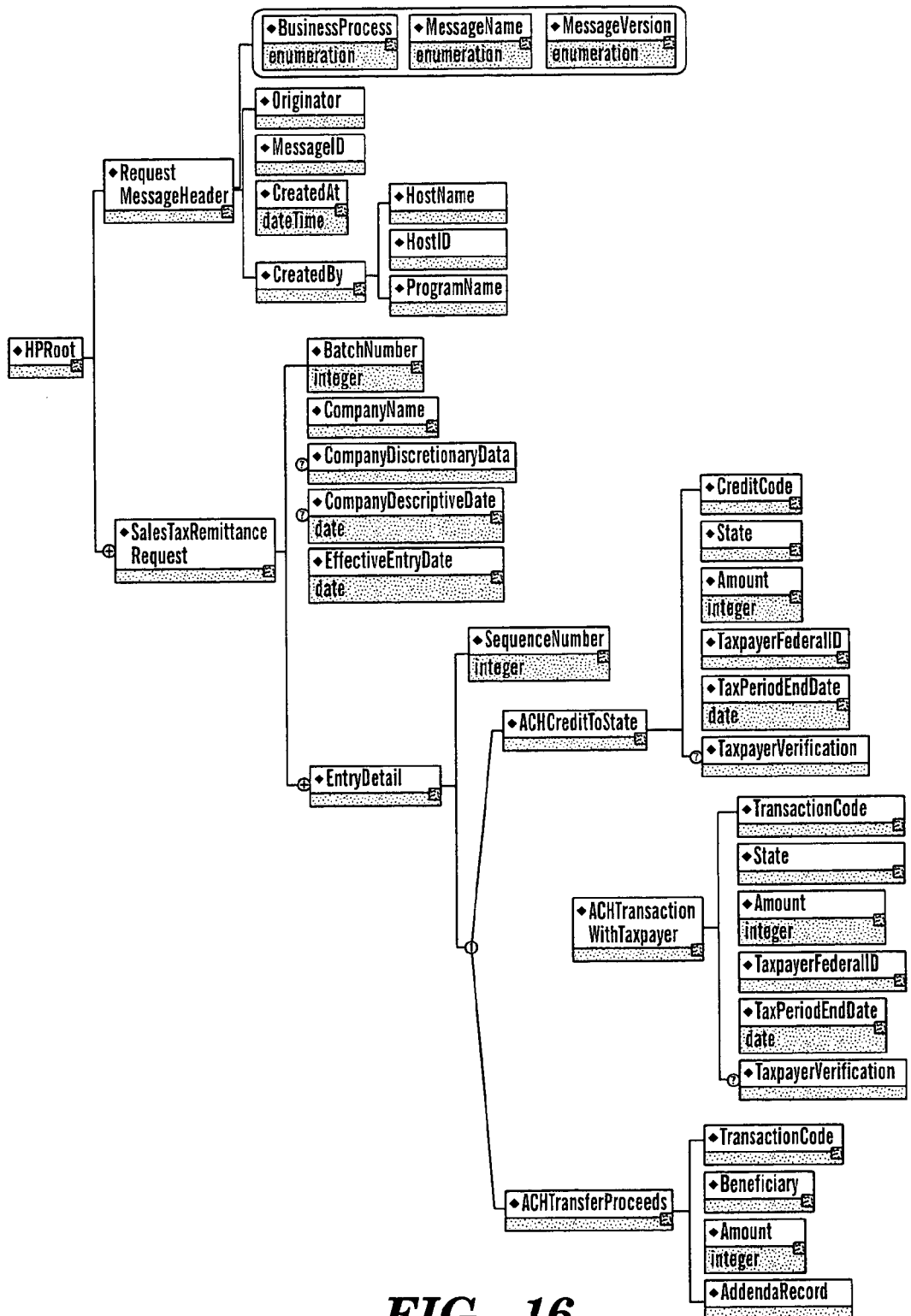
FIG. 16 is a DTD element diagram showing a tax remittance request, according to one aspect of the present invention.

An example sales tax remittance request XML-based message, in accordance with the DTD element diagram set forth in FIG. 16, is as follows:

The sales tax remittance response XML-based message preferably contains additional elements, set forth by way of example in Table II:

| XML Message | Element Description |
|---|---|
| <HPRoot> | The root of this XML message. Required. |
| <ResponseMesssageHeader BusinessProcess="SalesTaxRemittance" MessageName="SalesTaxRemittanceResponse" MessageVersion="1.1.0" | Message Header and Version. Required and fixed. |
| <ResponseToRequest> | Describes the corresponding Response. Required. |
| <Originator e-dsize="40"> Taxware</Originator> | Describe the corresponding Request Originator. Required. |
| <ReceivedAt TimeZone="GMT" e-dtype="dateTime">2000-10-30T09:56:03</CreatedAt> | Received date and time is defined in the ISO 8601 format. Required. For example, 2000-10-30T09:56:03 is Oct. 30, 2000 at 9:56:03. |
| <SalesTaxRemittanceResponse> | This is the Response for the Sales Tax Remittance Request messages. Required. |
| <TransactionID e-dtype="int">100<TransactionID> | This is the TransactionID for this group of Sales Tax Remittance Request messages. Required. |
| <SalesTaxRemittanceResponseError> <BadElement> | |
| <ElementName e-dsize="7" e-dtype="int">1 </ElementName> | This field contains the Element name, which contains a bad value. Required. |
| <LineNumber e-dsize="7" e-dtype="int">1 </LineNumber> | This field contains the line number of Bad Element in an XML file. Required. |
| <ColumnNumber e-dsize="7" e-dtype="int">1 </ColumnNumber> | This field contains the column number of Bad Element in an XML file. Required. |
| <ErrorMessage e-dsize="7" e-dtype="int">1 </ErrorMessage | This field contains the Error Message. Required. |
| <ErrorMessageDetail e-dsize="7" e-dtype="int">1 </ErrorMessageDetail> | This field contains Error Message Detail. Required. |

EXAMPLE II

Figure 17:
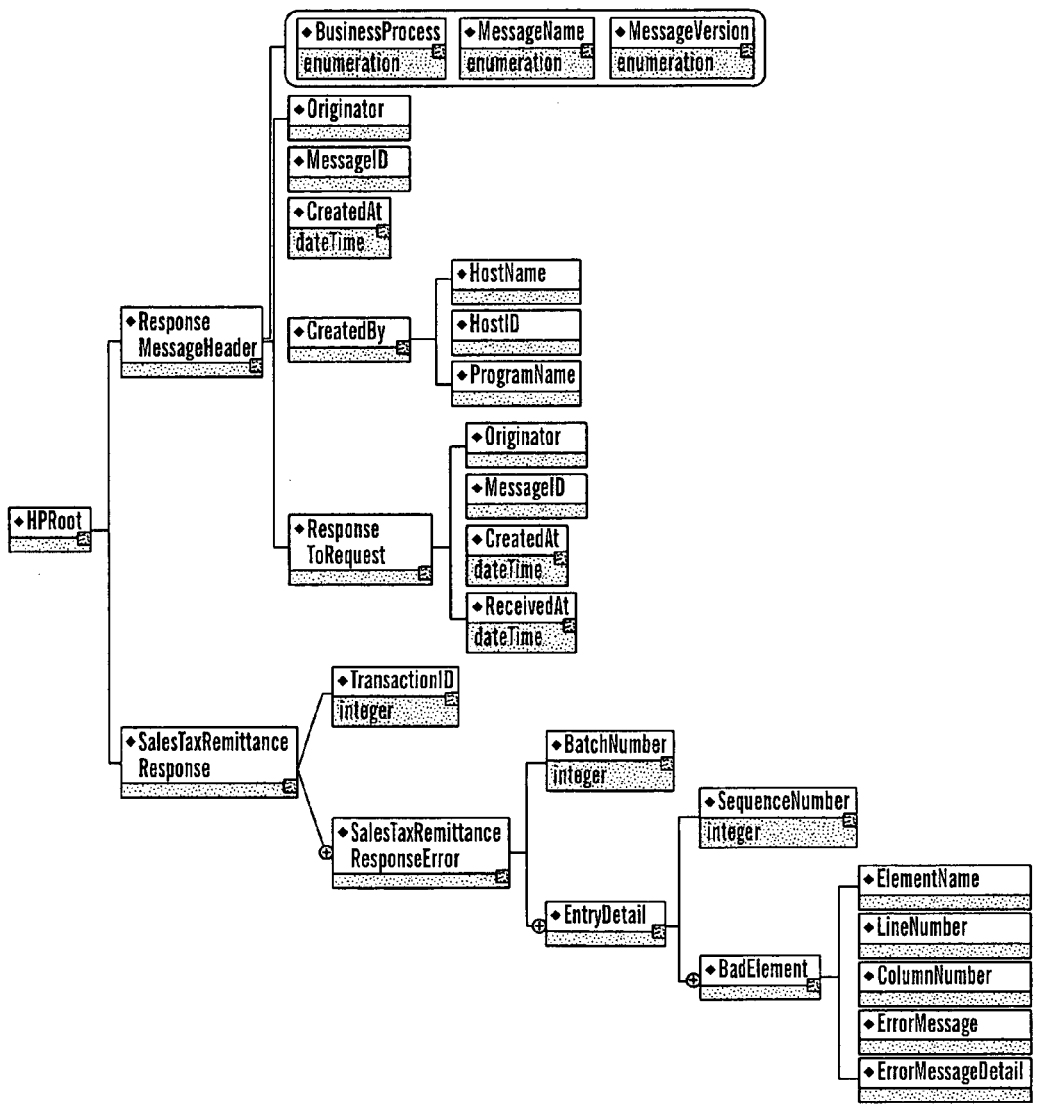
FIG. 17 is a DTD element diagram showing a tax remittance response to the request of FIG. 16.

Illustrated below is a sales tax remittance response XML-based message, according to the DTD element diagram of FIG. 17.

As for the sales tax remittance status request and status response, XML-based messages, they relate to the following additional elements, as set forth in Table III:

| XML Message | Element Description |
|---|---|
| <RequestMessageHeader BusinessProcess="SalesTaxRemittance" MessageName="SalesTaxRemittanceStatusRequest" Message Version="1.1.0"> | Message Header and Version. Required and fixed. |
| <SalesTaxRemittanceStatusRequest> | This is a batch of Sales Tax Remittance Status Request messages. Required. |
| <RequestMessageHeader BusinessProcess="SalesTaxRemittance" MessageName="SalesTaxRemittanceStatusResponse" MessageVersion="1.1.0"> | Message Header and Version. Required and fixed. |
| <SalesTaxRemittanceStatusResponse> | This is a Status Response for the Requested Sales Tax Remittance Request messages. Required. |
| <RemittanceStatusDetail> | This provides Status details for the requested Sales Tax Remittance Request messages. Required. |
| <RemittanceStatus Status="ACHSubmitted"> | There are three Status-"RequestReceived", "ACHCreated" and "ACHSubmitted". Required. |
| <ACHFileControlRecord> | This gives the details of the ACHFileControlRecord for the requested Remittance request. |
| <BatchCount e-dsize="7" e-type="int">3 <BatchCount> | This is the number of batches in the Sales Tax Remittance Request messages. Required. |
| <TotalDebitAmount e-dsize="10" e-type="int"> 1000</TotalDebitAmount> | This is the TotalDebitAmount is the Sales Tax Remittance Request messages. Required. |
| <TotalCreaditAmount e-dsize="10" e-type="int"> 1000</TotalCreaditAmount | This is the TotalCreaditAmount in the Sales Tax Remittance Request messages. Required. |
| <ACHBatchControlRecord> | This gives the details of the ACHFileControlRecord for the requested Remittance request. Required. |

-continued

| XML Message | Element Description |
| --- | --- |
| <BatchNumber e-dsize="7" e-type="int">1000</BatchNumber> | This is the batch number of the group of Sales Tax Remittance Request messages. Required. |
| <TotalDebitAmount e-dsize="10" e-type="int">1000</TotalDebitAmount> | This is TotalDebitAmount of this batch in the Sales Tax Remittance Request messages. Required. |
| <TotalCreaditAmount e-dsize="10" e-type="int">1000</TotalCreaditAmount> | This is TotalCreaditAmount of this batch in the Sales Tax Remittance Request messages. Required. |

EXAMPLE III

Figure 18:
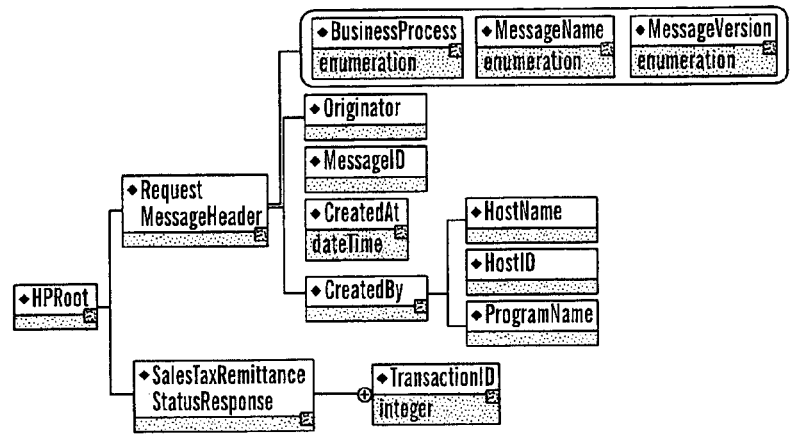
FIG. 18 is a DTD element diagram showing a tax remittance status request for the request of FIG. 16.

Next is a sales tax remittance status request XML-based message, also illustrated as a DTD element diagram in FIG. 18.

EXAMPLE IV

Figure 19:
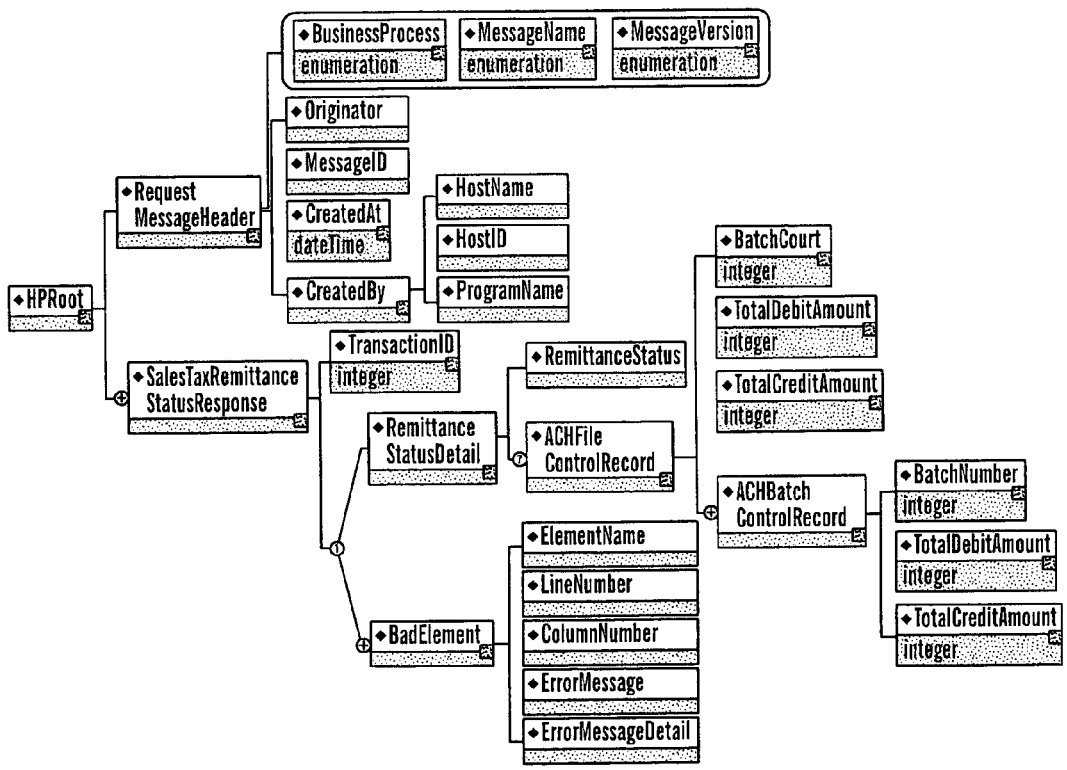
FIG. 19 is a DTD element diagram showing a tax remittance status response for the response of FIG. 18.

A sales tax remittance status request XML-based message, in accordance with the DTD element diagram of FIG. 19, is as follows.

Turning now to a further aspect of the present invention, system hardware preferably defines three discrete operating environments, namely, two Unix-based systems and one Windows NT server. The first Unix-based system, which is dedicated to sales and/or use tax computation operations, uses a conventional, high-performance operating system such as HP-UX 11.0 or the like. A Web server, for instance, IPlanet Web Server 4.1 SP5 is used as well as an Oracle 8i database or the like equipped with Java 1.2.2.8. Desirably, in one embodiment, system applications software includes PL/SQL, Genie, TaXML, Financial Link and XMLPost.

The second Unix-based system also utilizes a conventional Unix operating system such as HP-UX 11.0 and is dedicated to sales and/or use tax remittance functions. It is also desirable that the system utilize a Web server, e.g., a WebLogic JSP/J2EE Server 5.1.0, an A-Class HP9000 Server or the like, an Oracle V 8.1.6 database, and Java 1.2.2.8. In addition, it is preferred that the system applications software comprise various off-the-shelf routines such as Saxon 5.5.1 or XSLT, XML Convert 2. , JDOM XML Parser b6, and Commpress 2000.

Third, a Windows NT server, e.g., an IIS 4.0 or the like, is preferably used to the sales and/or use tax reporting function. This server has a conventional operating system such as an NT 4. x w/SP 6 & option pack. As with the Unix-based systems above, an Oracle 8i Client database with Java 1.2.2.8 is desired. Preferred application software for the server is Crystal Reports 8.0.

Referring now to another aspect of the present invention, an exemplary directory structure is set forth in Table IV below:

| Directory | Contains |
| --- | --- |
| /opt/ssts/bin | Configuration files (ssts.properties, ssts_errors.properties, ssts_xml_errors.properties) |
| /opt/ssts/bin/classes | All required java class files |
| /opt/ssts/bin/chronjobs | Cronjob scripts |
| /opt/ssts/DTDandConfiguration | DTD files |
| /opt/ssts/src/java | Java source files |
| /opt/ssts/src/xsl | XSL files |
| /opt/ssts/src/xfl | XFL files |
| /opt/ssts/src/db | Database script files |
| /opt/ssts/work/logs | FTS logs |
| /opt/ssts/work/xml | XML files |
| /home/ftp/citi/inbox | ACH Receipt from Citi |
| /home/ftp/citi/outbox | Compressed ACH file |
| /opt/WebLogicServer510/weblogic/myserver/public_html | HTML files |

DTD, it is noted, according to one aspect of the present invention, stands for document type definition, which is a model of an XML-based document. In addition, it is desirable that system communications be provided by open source software such as Wu-ftp or the like.

The present invention is also characterized by a main configuration file for Financial Link. As provided in Table V, for example, the file is /opt/ssts/bin/ssts.properties. The parameters identified enable the user to create a custom properties file.

| Parameter | Definition |
| --- | --- |
| ssts_root_dir | Root directory where TRS files are located. |
| ssts_working_dir | Working directory where log files, XML files are located. |
| ssts_dtd_dir | Directory where DTD's are located. |
| citi_ftp_dir | Directory where Citi works with ACH files. |
| dtd_message_version | Current DTD message version |
| db_jdbc_url | This parameter specifies the jdbc connect string to the database where requests and responses are logged. Set this parameter using the following format: jdbc:oracle:thin:@servename:portname:databasename,\ For example: jdbc:oracle:thin:@ecs06.external.hp.com:1521:epay |
| db_user_name | Database user name, where the TRS server logs the requests and responses. |
| db_passwd | Database password, where the TRS server logs the requests and responses. |
| ssts_host | Hostname of the FTS |
| ssts_port | Port Number form where we can access SstsServlet |
| client_cert | Name of the Client certificate, required for two-way authentication. |
| client_cert_pass | Password of the Client certificate, required for two-way authentication. |
| dbug_mode | If this parameter is set to "true", useful details are printed to aid in debugging; otherwise, if set to "false", then no details are printed. |

Figure 2:
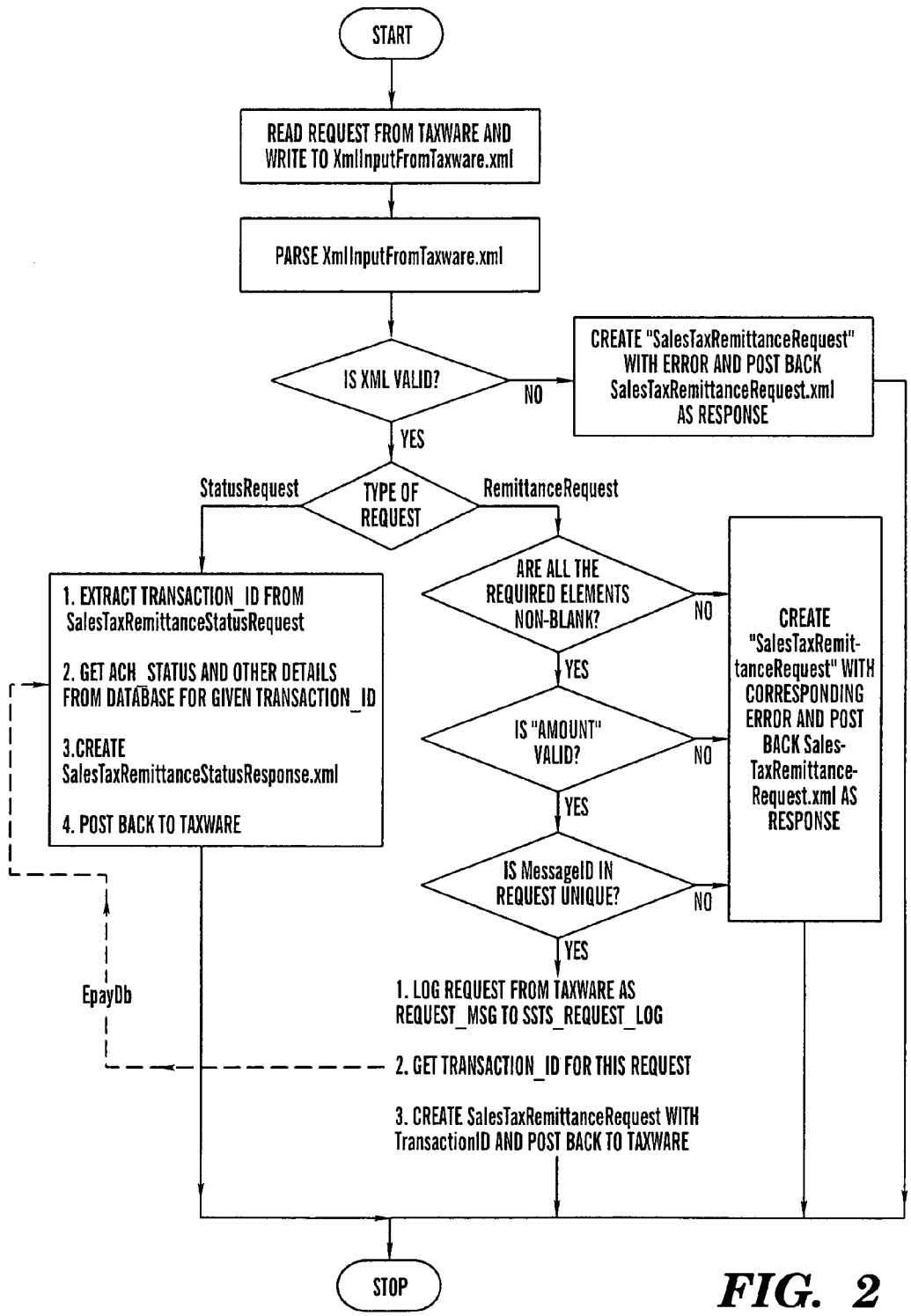
FIG. 2 is a flow diagram showing a module of the system and method of FIG. 1 for retrieving an XML-based transaction request from a tax computation system, verifying the request, and responding to the computation system whether the request has been successfully retrieved.
Figure 3A:
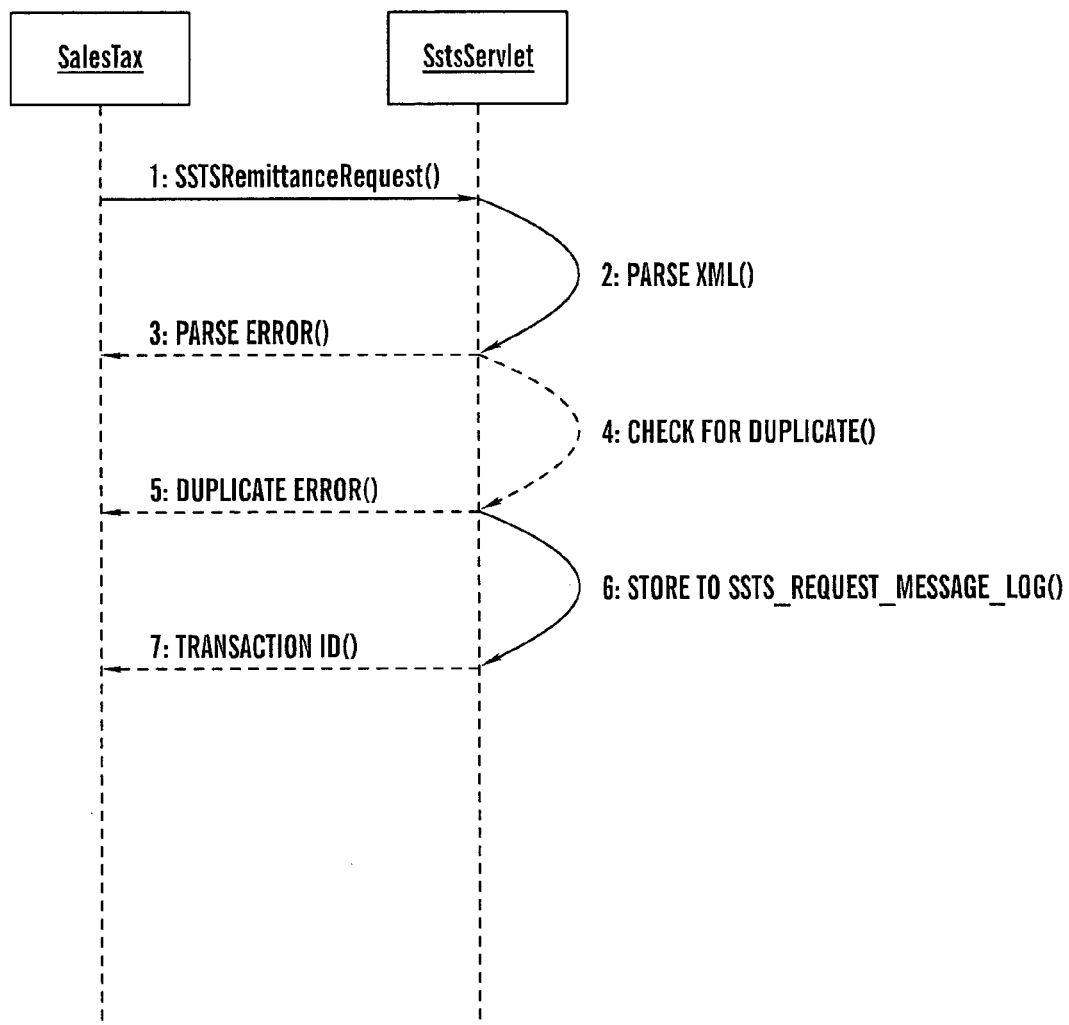
FIG. 3A is a flow diagram showing a first process flow of the method of FIG. 2.
Figure 3B:
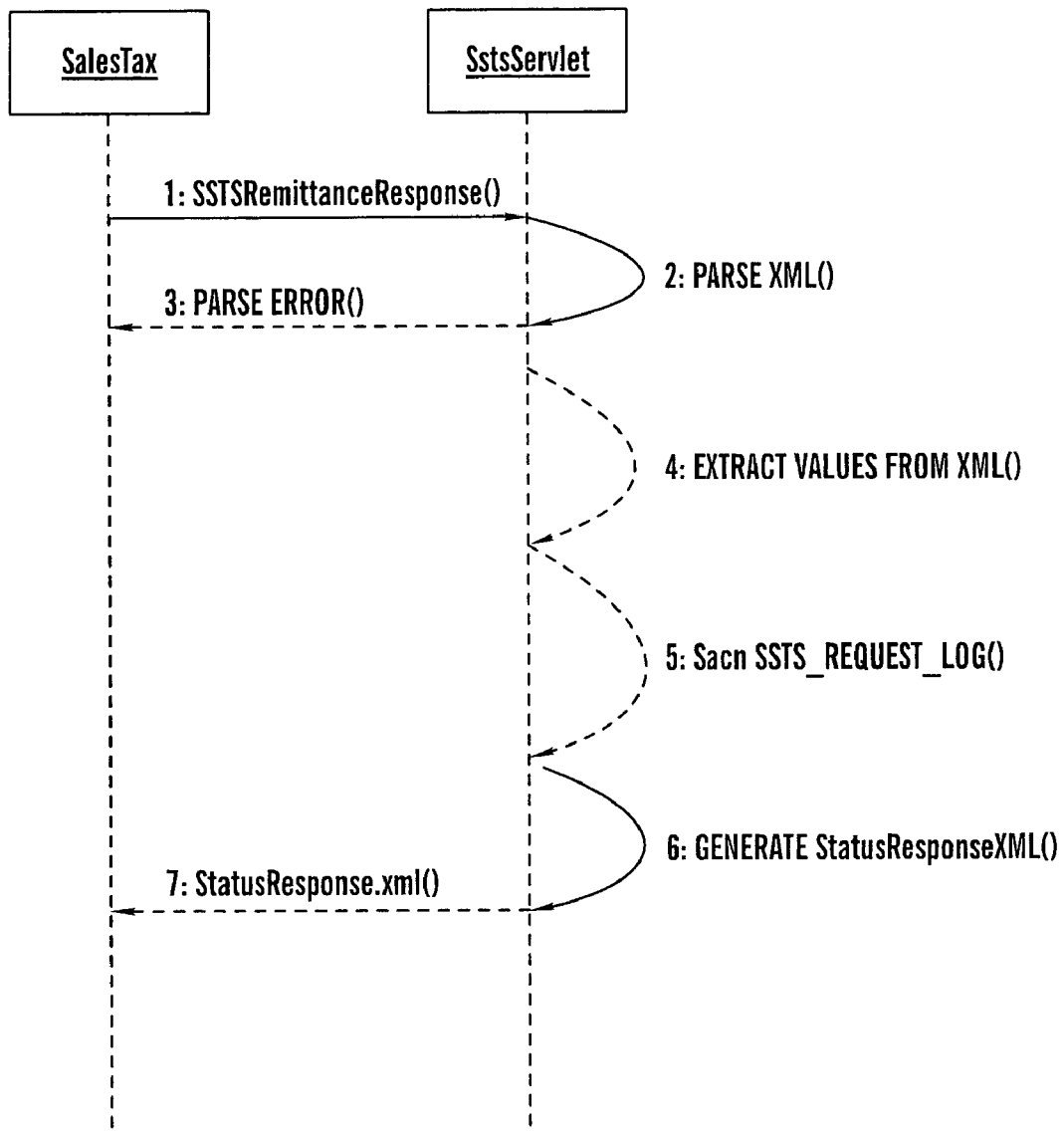
FIG. 3B is a flow diagram showing a second process flow of the method of FIG. 2.
Figure 4:
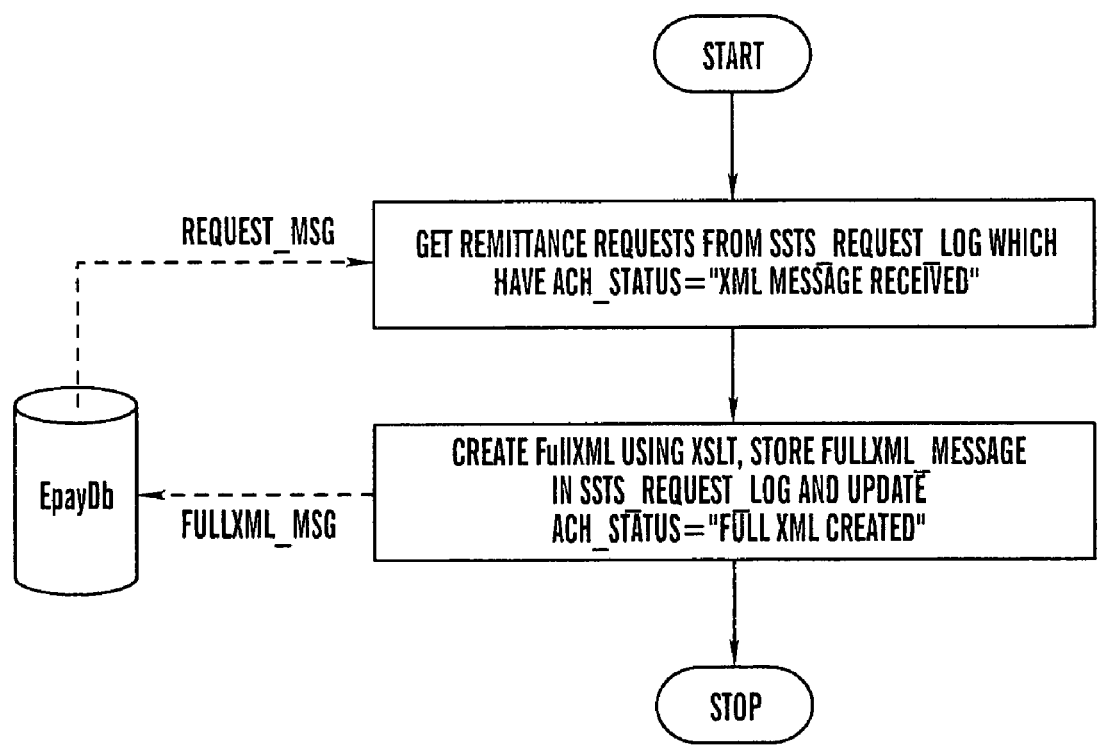
FIG. 4 is a flow diagram showing a module of the system and method of FIG. 1 for creating a master XML-based transaction request file based on at least one XML-based transaction request retrieved in FIG. 2.

Turning now to another aspect of the present invention, the apparatus includes a plurality of program controlled modules, preferably arranged operationally in series, for performing discrete services or sub-levels of operation. According to one aspect of the present invention, as illustrated in FIGS. 2-3B, a module 160 (e.g., SstsServlet or java based application downloaded to the server) is provided for receiving an XML-based transaction request from a tax computation system, checking the request for any errors and communicating such determination back to the system. This module is effectively the main point of entry for the present invention, in general, and the host server, e.g., a WebLogic server, in particular.

In operation, the SstsServlet performs a method 220 that begins with the step of inputting 221 an XML-based transaction request 11 to apparatus 10 from tax computation module 130. In practice, this may involve a tax computation program such as TaxWare, T-Square or the like, periodically posting an XML-based message 18 to the host or remittance server. Next, the request is read 222 and data contained in the request is written 223 to a selected XML-based input file 158 of database 150. Next, the system parses 224 the selected input file to determine whether XML-based transaction request 11 is valid. If the request is invalid, then an XML-based file 19 is created 225 which includes the request and error, and is sent 226 to the tax computation module in reply. If the request is valid, then the system determines 227 the type of request being made.

If the request is a status request, then transaction identifier 16 is extracted 228 from the request. An XML-based file 21 is retrieved 229 from database 150 that contains the status of the current automated clearinghouse network and other data for the request. The system creates 230 a response 22 to the request to indicate that the request has been successful, and sends 231 the response to the tax computation module.

If the request is a remittance request, then the system determines 232 whether all required elements of the request are non-blank. Should all required elements of the request be non-blank, then the system determines 233 whether the amount of tax computed 13 is valid. And if the amount of tax computed is valid, then the system determines 234 whether the message identifier in the request is unique. Moreover, if the message identifier is found to be unique, then the request is stored 235 in a TXP-based log file 23 of the database, the transaction identifier for this request is retrieved 236 from the database, and a file 24 is created 237 that includes the request and transaction identifier to indicate that the request has been successful, and file 24 is sent 238 to the tax computation module in response. An exemplary log file for transaction requests to the system is shown in Table VI:

| Column Name | Data Type | Not Null | Unique | Remarks |
|---|---|---|---|---|
| TRANSACTION_ID | VARCHAR2(40) | Not Null | Yes | Oracle sequence number. |
| REQUEST_MSG | CLOB | | | Incoming XML from SalesTax stored as CLOB |
| REQ_MSG_ID | VARCHAR2(10) | Not Null | Yes | Message_Id extracted from incoming XML from SalesTax. |
| RECEIVED_DATETIME | DATE | | | Date with time stamp |
| FULLXML_MSG | CLOB | | | The generated FULLXML stored as CLOB |
| ACHFILE_ID | VARCHAR2(10) | | | Oracle sequence number |
| ACH_STATUS | VARCHAR2(3) | Not Null | | Current status of remittance request. 100-RequestMessageReceived 150-FullXmlCreated 200-ACHCreated 300-ACHSubmitted |

Primary Key: TRANSACTION_ID
Index: ACHFILE_ID

As for an ACH file log, a sample is set forth in Table VII, as follows:

| Column Name | Data File | Not Null | Unique | Remarks |
|---|---|---|---|---|
| ACHFILE_ID | VARCHAR(10) | Not Null | Yes | Oracle sequence number |
| ACHFILE_TXT | CLOB | | | The ACHFILE.txt is stored as CLOB |
| MASTER_XML | CLOB | | | The MASTER.XML is stored as CLOB |
| ACHCREATED_DATETIME | DATE | | | Date |
| ACHSUBMITTED_DATETIME | DATE | | | Date |
| ACH_RECEIPT | CLOB | | | The ACHRECEIPT is stored as CLOB |

Primary Key: ACHFILE_ID

Finally, should at least one required element of the request be blank, or if the amount of tax computed is invalid, or if the message identifier is not unique, then a file 25 is created 239 that includes the request and error to indicate that the request is erroneous. Ultimately, the file is sent 240 to the tax computation module. This marks substantially complete execution of the SstsServlet module.

It is preferred that a user access the SstsServlet module from a browser/java program using, e.g., the command "https://remit.streamlinedsaletax.com:4444/SstsServlet". The user may post the XML-based request to the SstsServlet using "https://remit.streamlinedsaletax.com:5555/Post.html". Preferably, data transfer and communications for the system are tunneled for optimum security.

Next, after passing the verification stage, XML-based transaction request 11 is passed 241 to a module 161 that creates 242 a master XML-based transaction request file 26. This method is shown generally in FIG. 4. Initially, a log file 27 is retrieved from database 150 which indicates that a successful request for transmission of tax related data has been made. The master XML-based transaction request file is then created and stored 243 in the database log file 27. Last, an automated clearinghouse network TXP-based status file 28 is accessed 244 from the database and updated 245 to indicate that a master XML-based file has been created in the log file.

For example, a stand-alone java program, or CreateFullXml, is used to transform a file, or RemittanceRequest, into the master XML-based file, or FullXml, and stored in the database. The program is a main java class file located under the "/opt/ssts/bin/classes/CreateFullXml" directory. It is preferably also a scheduled chron job under CreateFullCron.sh in the "/opt/ssts/bin/cronjobs" directory. It is noted that the user may verify log files in "/opt/ssts/work/logs".

Figure 5:
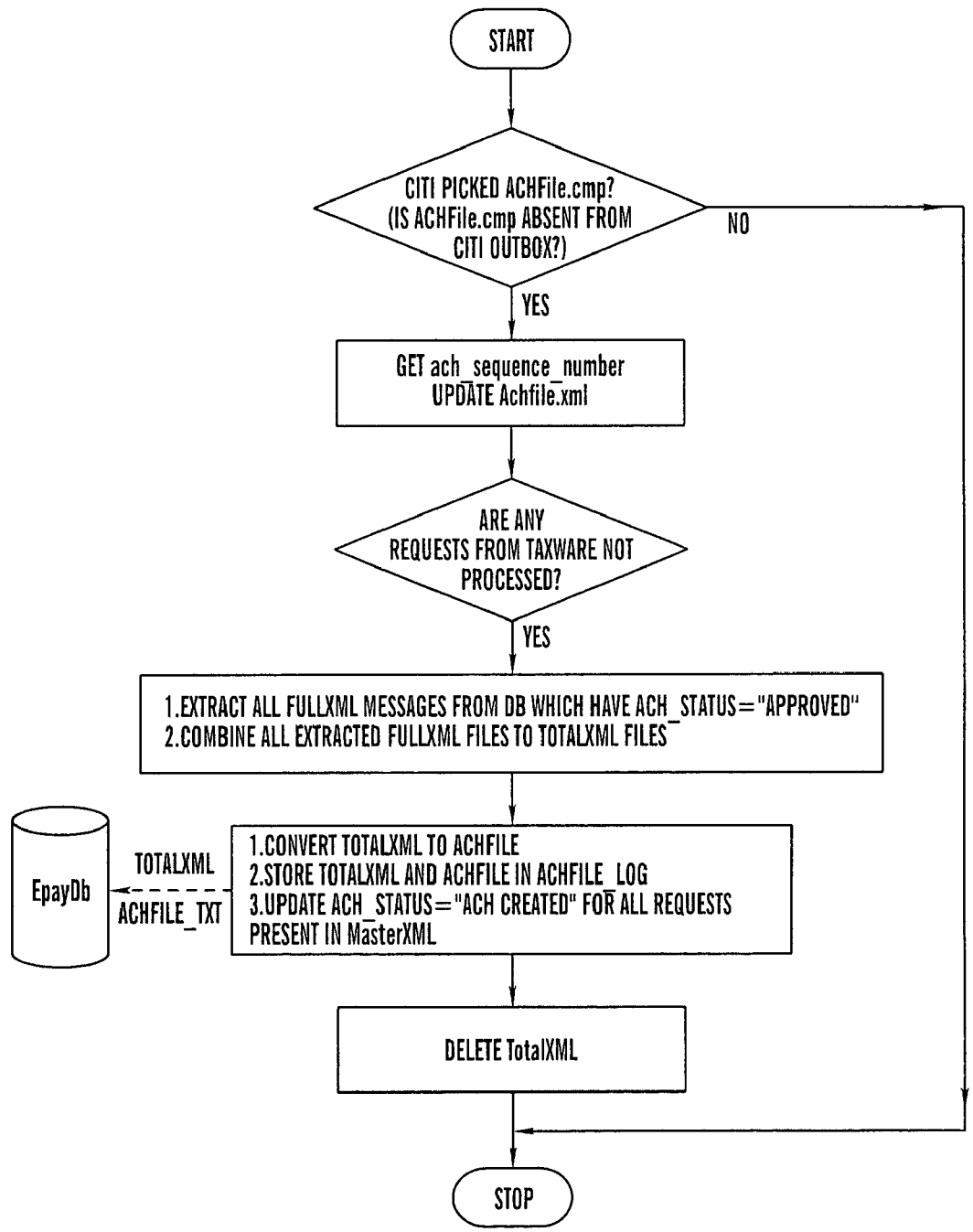
FIG. 5 is a flow diagram showing a module of the system and method of FIG. 1 for converting the master XML-based transaction request file of FIG. 4 to an automated clearinghouse network TXP-based file.

Thereafter, another operative module 162 is encountered. As best seen in FIG. 5, this module serves to create a TXP-based file 29 for automated clearinghouse network 90. The first step is to determine 246 whether a TXP-based file is present in outbox file 153 of the system for receiving the XML-based transaction request from the tax computation module. If a TXP-based file has been detected in the outbox file, then no conversion is performed. Should no TXP-based file be detected in the outbox, then a sequence number 31 is selected 247 for updating an XML-based file 32 for the network. If a request from the tax computation module has not been processed, then a master XML-based request file 33 is retrieved 248 from the database that has an automated clearinghouse network approval status.

Next, retrieved master XML-based request file 33 is combined 249 with total XML-based request file 151. The total XML-based file is converted 250 to a TXP-based file 34, and both the total XML-based file and TXP-based file are stored 251 in an automated clearinghouse network log file 35 of the database. The status file in the database for the network is updated 252 to indicate that an automated clearing house TXP-based file has been created for XML-based transaction requests, desirably for all such requests, in the master XML-based request file. Finally, the total XML-based request file is deleted 253.

In practice, according to one aspect of the present invention, a stand-alone java program, i.e., a CreateACHFile module, builds the TotalXML file and converts it to an ACH file, i.e., ACHFile.cmp. This program is preferably a scheduled or cron job, i.e., a Unix utility, and is a main java class file stored, e.g., under "/opt/ssts/bin/classes/CreateACHFile". Another stand-alone java program is provided, i.e., a ViewLogs module, allows the user to check the status of the files in the automated clearinghouse network, or ACHStatus, the remittance XML-based transactions, or RemittanceXml, the automated clearing house file, or ACHFile, and FullXml files for a selected transaction identifier, TransactionID. This module is desirably a main java class file located, for example, at "/opt/ssts/bin/classes/ExtractCLOB", accessed from a browser/java program using "https://localhost:4444/ViewLogs". It is noted that the remit.streamlinedsaletax.com system must be tunneled and that a Client Certificate is required.

Although the present invention has been shown and described in connection with various functional modules operating on a server of a service provider, it is understood that one or more such modules may be provided, alternatively or concurrently therewith, on a server of the subscriber system, within the spirit and scope of the present invention. Moreover, while the present invention is presented as having each of its functions in relatively distinct software modules, it is understood that operative aspects of these functions may be structured in a non-modular fashion, in clusters of modules and non-modules, or in any combination thereof, giving consideration to the purpose for which the present invention is intended.

Referring now to a process 260 for transaction request approval, all transactions from the tax computation system are presented for review and approval. The process, as viewed through a network browser, is set forth generally and illustratively in selected screen-shots, shown in FIGS. 10-15. According to one embodiment, when transaction requests are in cue for approval, reviewer 17 such as a tax specialist is notified, e.g., via e-mail, that a selected number of transactions are awaiting approval. Next, the reviewer logs-on to the system of the present invention. This is accomplished, e.g., by merely entering a selected username and password. The identity of the user is checked and if verified, for each transaction reviewed, the user is prompted to either approve, reject or suspend the transaction More particularly, the reviewer accesses the approval process operation, i.e., the approval servlet or module, by entering a selected URL in a Web browser, e.g., "https://localhost:4444/approve.html". It is noted, again, that the "remit.streamlinedsaletax.com system" must be tunneled and that a Client Certificate is required. The browser then displays an entry portal or Web page for access to the system, as show in FIG. 10. During the next step, a list of pending transactions is retrieved. This is accomplished, for instance, by clicking on a "Get List" button on the wire frame or Web page. The application displays all pending transactions, i.e., those transactions in a current batch that are waiting for approval, rejection or. A screen-shot showing a Web page for viewing this information is shown, for example, in FIG. 11.

Figure 14:
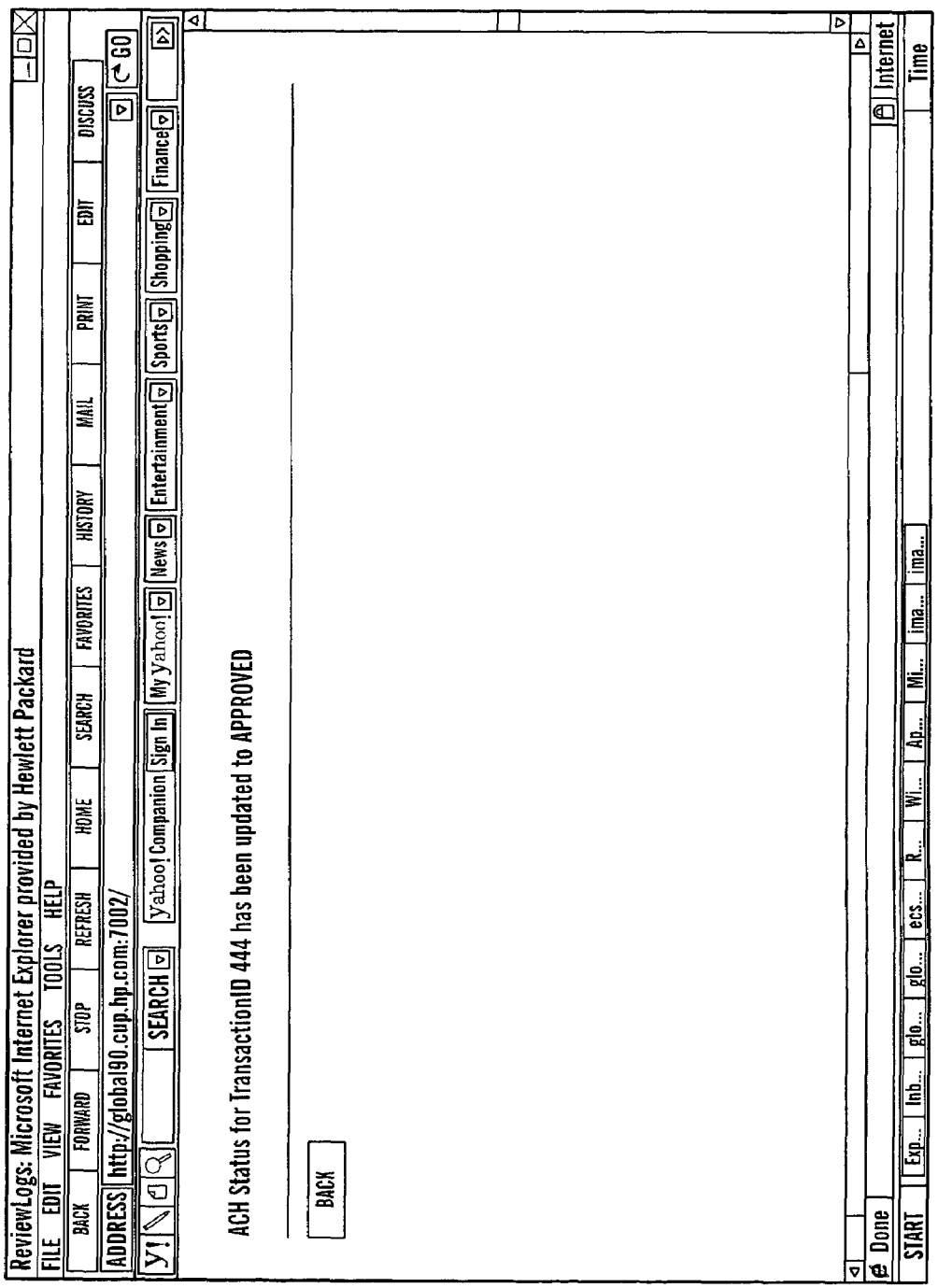
FIG. 14 is a screen-shot illustrating a virtual portal for displaying confirmation of the approval/rejection/suspension of the transaction viewed in FIG. 12.
Figure 15:
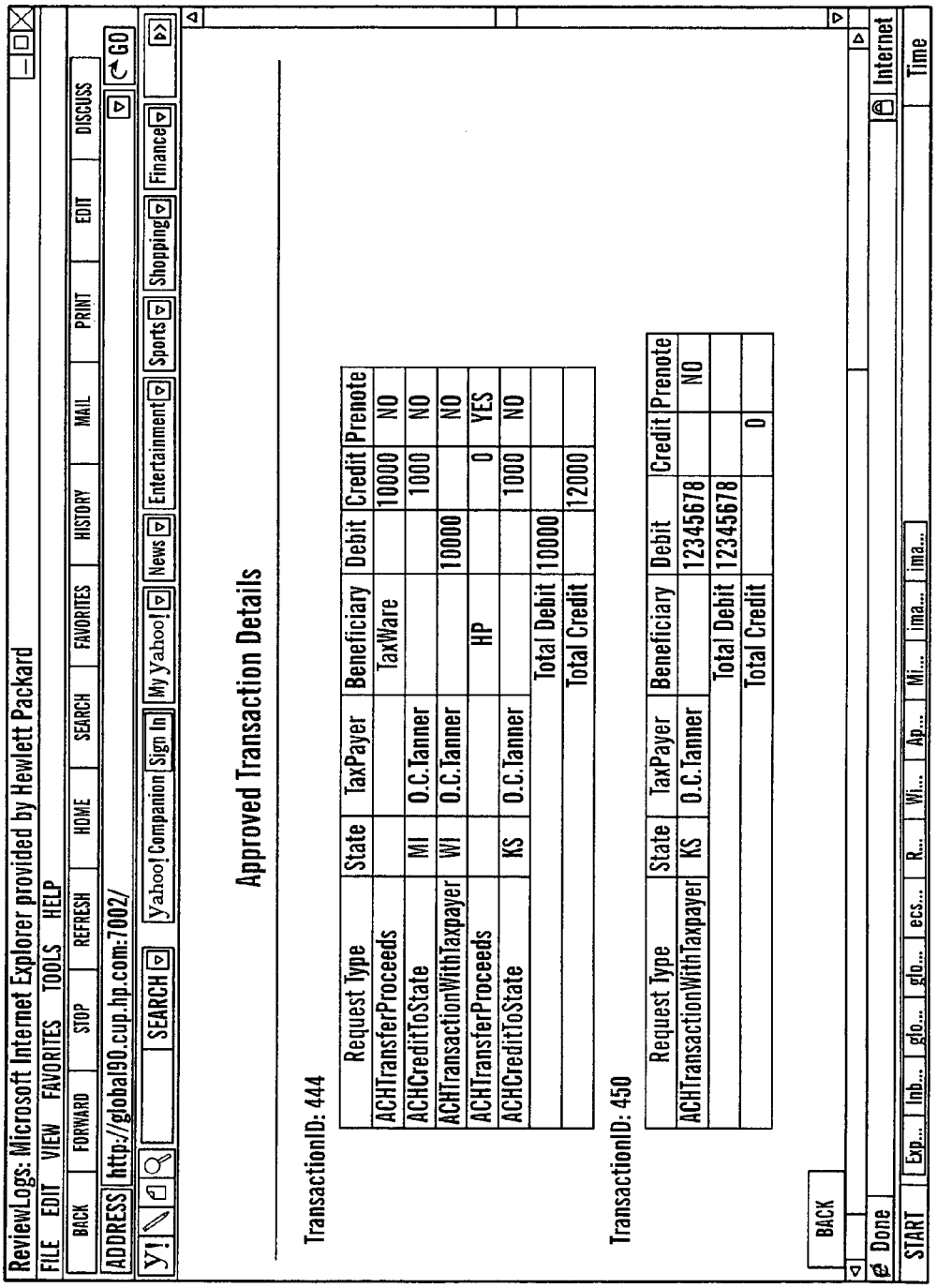
FIG. 15 is a screen-shot illustrating a virtual portal for displaying details of all transactions of a selected batch that have been approved according to the system of FIG. 10.

According to one aspect of the present invention, to approve/reject/suspend a transaction, the user first enters a transaction identifier in the approval process entry page for the transaction to be approved, and clicks on a "Submit" button. The details of the transaction are preferably displayed in summary or tabular form, as illustrated in FIG. 12. To view the original XML-based files, the user selects "Get Remittance Request File" or "Get FullXml File". If "Get Remittance Request File" is selected, then the application displays "Remittance Request XML" from the tax computation system, as shown in FIG. 13. To approve/reject/suspend this transaction, corresponding buttons are displayed. To submit the user's selection, he/she clicks on the desired button. Confirmation of the user's selection is displayed, as shown in FIG. 14. Finally, to view details of all approved transactions in the batch, the user clicks on a "Get Approved Totals" button on the approval process entry page. In response, the system displays the details of each transactions in the batch that has been approved, as shown in FIG. 15.

To notify the reviewer, a stand-alone program, e.g., NotifyToReviewer, is used. This program or module sends e-mail notification to the reviewers in the event at least one transaction request is awaiting approval in the system. This module preferably is a main java class file located under "/opt/ssts/bin/classes/SendNotification". Like CreateFullXml, this module is preferably a scheduled or cron job that operates more or less concurrently therewith.

Yet another aspect of the present invention relates to the specifications of each XML-based transaction request or message. In particular, a remittance server located at a selected port, e.g., port 7002 ecs06. external.hp.com, accepts an XML encoded request and returns and an XML encoded response. To initiate a transaction, initially an XML-based request or document is generated. Second, a connection is made with the remittance server via a security system (e.g., SSL—Secure Socket Layer Version 3). Next, an XML-based request is sent preferably using HTTP Post. Finally, the remittance server processes the XML-based request and returns an XML-based response, also desirably using HTTP protocol. Notably, communications between the SSTS and remittance server utilizes the request/response model.

Moreover, Web server software, e.g., Sudo, is utilized for allowing a permitted user to execute a command as the superuser or another user, as specified in the Sudoers file. By default, Sudo requires that users authenticate themselves with a selected password. Once a user has been authenticated, a timestamp is updated and the user may then use Sudo without a password for a selected period of time (e.g., five minutes by default). Sudo further determines who is an authorized user by consulting the file "/etc/sudoers". If a user who is not listed in the "sudoers" file attempts to run a command via Sudo, e-mail is sent to the proper authorities. Moreover, Sudo can record in a log both successful and unsuccessful attempts or errors to syslog(3), a log file, or both. By default, Sudo will log via syslog(3) but this may be modified at the time of configuration.

In general, the system of the present invention initiates a request to the remittance server each time a transaction is undertaken, and the remittance server responds to the request. The response may be an acknowledgment that a request has been received, that the request is erroneous, or that the request has been received and processed. The remittance server preferably responds only to system initiated requests, and is not programmed to initiate any request to the system nor will it generate any unsolicited response to the system. Requests and responses are desirably encoded in the form of XML-based requests. Both the system and the remittance server perform validation checks and reject any invalid XML-based requests.

The present invention offers numerous benefits over conventional tax preparation and reporting methods. First, it enables subscribers to electronically outsource the burden of sales and/or use tax calculation and remittance to state-certified service providers. In this manner, subscribers need not determine the tax rates applicable to each sales transaction, nor otherwise preoccupy themselves with regional tax laws. Subscribers also need not be concerned about the accuracy of the information they provide to government authorities.

A second benefit is that subscribers may now significantly reduce their internal information technology expenses since they no longer need to maintain an in-house, internally-developed sales and/or use tax calculation system. Furthermore, the invention significantly reduces the audit exposured of participating subscribers since municipalities, states and other government authorities may now have access to complete transaction records electronically maintained by the service provider and, thus, may issue audit waivers to participating subscribers.

Finally, at the kernel of the present invention is the use of free public domain, off-the-shelf (COTS) technologies, open source and other industry standard software, rather than proprietary, subscriber-specific software, such that long term supportability is assured. Examples include, but are not limited to, XML, XML/DTD, ACH/TXP, Java, JSP and J2EE, e.g., Java 1.2, HTTP Post, SOAP, Secure Shell (SSH), SSLv3, Sudo and Apache web server software, e.g., HP-UX-11.0, and oracle database software, e.g., Oracle V 8.1.6. This reduces considerably their system development and deployment costs.

In addition, subscribers no longer must purchase tax software for each business application in their portfolio, no longer require dedicated information technology resources to administer tax systems, and no longer must build custom components to integrate tax software with their specialized business applications.

Instead, a Web service (or e-service) is provided for automatically, securely and efficiently remitting sales and/or use tax data for the subscriber. The service is readily accessible, i.e., publically over the Internet, requires only a conventional Internet browser, e.g., Microsoft Internet Explorer Version 4.0, yet maximum system and data security is provided. Unlike prior systems, no specialized communications equipment, dedicated phone line, or other independent setup is required. This virtually eliminates startup costs and other large expenses usually associated with new communications systems.

The present invention's use of industry standard tools for implementing security is another helpful aspect. In particular, it is preferred that data encryption be provided by SSLv3. Authentication desirably is provided by digital certificate, public/private key authentication of SSH. The communication channel between the SSTS and the remittance server is secured, e.g., by the use of SSL, Version 3. The SSL session is established only after a successful client/server authentication. Additionally, non-repudiation can be established through the use of audit log files. It is preferred that only XML-based requests with the correct originator are processed, and the originator must first be registered with the remittance server. Data integrity security is provided by digital signature. Finally, audit security is facilitated by logging, as will be understood by those skilled in the art.

Accordingly, relatively strong protection from fraud is also provided. First, the present invention requires off-line registration of each subscriber. In particular, each subscriber must supply a federal tax I.D. and state tax I.D.'s which are securely stored in the database server. This information is also contained in a TXP file for sales and/or use tax remittance to the automated clearinghouse network. In this manner, not only is the accuracy of the amount of tax remitted to the state insured, but also payment is attributed to the correct subscriber. Second, debiting from the automated clearinghouse network is always from the subscriber to the holding account. Third, the automated clearinghouse network credit is, in turn, always from the holding account to the states only. Fourth, the present invention utilizes a closed-loop system in which funds may only be transferred from a known and pre-registered bank account to another known and pre-registered bank account. Finally, at least one selected, authorized person must approve each fund transfer to the automated clearinghouse network.

Still another advantage of the present invention is its support of both conventional online and batch mode software. The tax calculation system sends an XML message request to the system of the present invention, which, in turn, replies with an XML message response. This on-line capability facilitates an immediate system response to any request, whether an error message, a rejection, or accepted transaction identifier. Although the above-described automated clearinghouse network was developed in the 1970's for batch processing only and, more particularly, to reliably process very large volume payments at a relatively low cost, the present invention transforms any on-line XML transaction request into an automated clearinghouse network TXP batch file. In this manner, it essentially transforms that system from a batch only operation into one that can repeatedly handle individual on-line transactions.

Overall, the present invention advantageously insures that tax computations, which were previously done manually, are done quickly, effectively, correctly and relatively paperlessly. It also provides that tax reporting is accomplished timely, without tardiness or loss in the mail, that any additional taxes due are paid, and eliminates penalties for late or incorrect tax payments. Collection of taxes by government treasuries is insured as taxes are paid directly via electronic funds transfer to the treasuries. Moreover, sales tax on transactions conducted over the Internet, that were previously uncollectible by states, may be paid without additional effort by the subscriber or customer.

Various modifications and alterations to the present invention may be appreciated based on a review of this disclosure. These changes and additions are intended to be within the scope and spirit of this invention as defined by the following claims.

What is claimed is:

1. A program controlled system for transmitting tax related data to a selected financial institution, reporting the data and remitting funds corresponding to the data to a selected government authority over an interactive communications network, the program controlled system comprising:
    a first function for receiving an XML-based transaction request from the program controlled system, wherein the first function receives the XML-based transaction request for purposes of computation of at least one of sales and use tax including at least one of sales and use tax for payments and accruals, verifying the validity of the request and replying to the program controlled system with an XML response;
    a second function for transforming the transaction request into a master XML-based request file and storing the master request file in a database;
    a third function for notifying an authorized third party to validate any request requiring approval prior to transmission of the tax related information file to the financial institution;
    a fourth function for transforming the master XML-based request file to a TXP-based file and locating the file in an outbox for retrieval by the financial institution;
    a fifth function for permitting the financial institution to securely and automatically retrieve the TXP-based file from the outbox; and
    a sixth function for securely logging and allowing the third party to review the TXP-based file.

2. A program controlled apparatus for transmitting tax related data to a selected financial institution, reporting the data and remitting funds corresponding to the data to a selected government authority over an interactive communications network, the apparatus comprising:
    a first function for receiving an XML-based transaction request from a program controlled system, wherein the first function receives the XML-based transaction request for purposes of computation of at least one of sales and use tax including at least one of sales and use tax for payments and accruals, and replying to the system with an XML-based response including a transaction identifier;
    a second function for verifying the validity of the XML-based request of the tax computation system and storing the valid transaction request in a database;
    a third function for transforming the request into a master XML-based request and storing the master request in the database;
    a fourth function for notifying an authorized third party to validate any request requiring approval prior to transmitting the tax related data;
    a fifth function for building a total XML-based file and transforming the file into a first TXP-based file for remitting information associated with the file over an automated clearinghouse network to a selected government authority, and for copying the first TXP-based file to an outbox file for secure and automatic access by the financial institution;
    a sixth function for receiving the first TXP-based file as a first TXP-based receipt file in an inbox file subsequent to processing of the first TXP-based file by the financial institution; and
    a seventh function for decrypting the first TXP-based receipt file, for storing the decrypted file as a second TXP-based receipt file in the database, and for deleting the first TXP-based file and the first TXP-based receipt file from the outbox file and inbox file, respectively.

3. A program controlled apparatus for transmitting tax related data to a selected financial institution, reporting the data, and remitting funds corresponding to the data to a selected government authority over an interactive communications network, the system comprising:
    a first function for receiving an XML-based transaction request from a system, wherein the first function receives the XML-based transaction request for purposes of computation of at least one of sales and use tax including at least one of sales and use tax for payments and accruals, and replying with an XML-based response including a transaction identifier;
    a second function for verifying the validity of the XML-based request of the tax computation system and storing the valid transaction request in a database;
    a third function for transforming the request into a master XML-based request and storing the master request in the database;
    a fourth function for notifying an authorized third party to validate any request requiring approval prior to transmitting the tax related data;
    a fifth function for building a total XML-based file and transforming the file into a first TXP-based file for remitting information associated with the file to a selected government agency, and for copying the first TXP-based file to an outbox file for secure and automatic access by the financial institution;

a sixth function for receiving the first TXP-based file as a first TXP-based receipt file in an inbox file subsequent to processing of the first TXP-based file by the financial institution; and a seventh function for decrypting the first TXP-based receipt file, for storing the decrypted file as a second TXP-based receipt file in the database, and for replacing each first TXP-based file and the first TXP-based receipt file in the outbox file and inbox file, respectively, with a null file.

4. A method for transmitting tax related data to a selected financial institution, reporting the data, and remitting funds corresponding to the data to a selected government authority over an interactive communications network, the method comprising the steps of:

inputting an XML-based transaction request to a program controlled apparatus from a system, wherein the XML-based transaction request is input to the program for the purposes of computation of at least one of sales and use tax including at least one of sales and use tax for payments and accruals, the apparatus transmitting the tax related data to the selected financial institution, reporting the data, and remitting the funds corresponding to the data to the selected government authority;

the apparatus reading the requests, writing data of the request in a selected XML-based input file of a database, and copying the input file to an outbox file for secure and automatic access by a third party;

the apparatus parsing the input file to determine whether the XML-based transaction request is valid;

if the request is invalid, then the apparatus creating an XML-based file including the request and error, and sending the file as a response to the tax computation system;

if the request is valid, then the apparatus determining the type of request being made;

if the request is a status request, then the apparatus extracting a transaction identifier from the request, retrieving a file from the database containing the current automated clearinghouse network status and other data for the request, creating an XML-based response to the request to indicate that the request has been successful, and sending the response to the tax computation system;

if the request is a remittance request, then the apparatus determining whether all required elements of the request are non-blank, and if all required elements of the request are non-blank, then determining whether the amount of tax computed is valid; and if the amount of tax computed is valid, then determining whether the message identifier in the request is unique, and if the message identifier is unique, then storing the request in a log file of the database, retrieving the transaction identifier for the request from the database, creating a file including the request and transaction identifier to indicate that the request has been successful, and sending the file to the tax computation system; and if at least one required element of the request is blank, or if the amount of tax computed is invalid, or if the message identifier is not unique, then the apparatus creating an XML-based file including the request and error to indicate that the request is erroneous, and sending the file to the tax computation system.

5. A method for transmitting tax related data to a selected financial institution, reporting and remitting funds corresponding to the data to a selected government authority over an interactive communications network, the method comprising the steps of:

retrieving a log file from a database of a program controlled apparatus from a system for purposes of computation of at least one of sales and use tax including at least one of sales and use tax for payments and accruals, the apparatus transmitting the tax related data to the selected financial institution, reporting the data and remitting the funds corresponding to the data to the selected government authority, the database indicating that a successful request for remittance of tax related information has been made;

the apparatus creating a master XML-based transaction request file;

storing the master XML-based file in the log file of the database and in an outbox file for secure and automatic access by a third party; and accessing an XML-based network status file from the database and updating the file to indicate that the master XML-based file has been created in the log file.

6. A method for transmitting tax related data to a selected financial institution, reporting the data, and remitting funds corresponding to the data to a selected government authority over an interactive communications network, the method comprising the steps of:

determining whether a TXP-based file for an automated clearinghouse network and created by a program controlled apparatus is present in an outbox of a system for receiving an XML-based transaction request from a system for purposes of computation of at least one of sales and use tax including at least one of sales and use tax for payments and accruals, and converting the request to a TXP-based file for the network, the apparatus transmitting the tax related data to the selected financial institution, reporting the data, and remitting the funds corresponding to the data over the network;

if no TXP-based file for network is detected in the outbox, then selecting a sequence number for updating an XML-based file;

if a request from the tax computation system has not been processed, then retrieving a master XML-based request file from a database which has an automated clearinghouse network approval status;

combining the retrieved master XML-based request file with a total XML-based request file;

converting the total XML-based file for TXP-based file for the network;

storing the total XML-based file and TXP-based file in a log file of the database and storing the TXP-based file in the outbox for secure and automatic access by the financial institution;

updating a status file for the network in the database to indicate that a TXP-based file for the network has been created for XML-based transaction requests in the master XML-based request file; and deleting the total XML-based request file.

* * * * *

UNITED STATES PATENT AND TRADEMARK OFFICE
CERTIFICATE OF CORRECTION

PATENT NO. : 7,379,907 B2  
APPLICATION NO. : 09/995190  
DATED : May 27, 2008  
INVENTOR(S) : Hong Michael Dang et al.

Page 1 of 1

It is certified that error appears in the above-identified patent and that said Letters Patent is hereby corrected as shown below:

In column 11, line 22 (Table 1), delete "e-dsize"6"" and insert -- e-dsize="6" --, therefor.

In column 11, line 35 (Table 1), delete "e-dsize"6"" and insert -- e-dsize="6" --, therefor.

In column 25, line 25, in Claim 4, delete "requests" and insert -- request --, therefor.

In column 26, line 41, in Claim 6, after "file for" insert -- the --.

In column 26, line 51, in Claim 6, delete "file for" and insert -- file to a --, therefor.

Signed and Sealed this

Twenty-first Day of July, 2009

JOHN DOLL  
*Acting Director of the United States Patent and Trademark Office*